US009916690B2

(12) United States Patent
Nobori et al.

(10) Patent No.: US 9,916,690 B2
(45) Date of Patent: Mar. 13, 2018

(54) CORRECTION OF DISPLAYED IMAGES FOR USERS WITH VISION ABNORMALITIES

(71) Applicant: Panasonic Intellectual Property Management Co., Ltd., Osaka (JP)

(72) Inventors: Kunio Nobori, Osaka (JP); Ayako Maruyama, Osaka (JP); Yumiko Kato, Osaka (JP); Tsuyoshi Inoue, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 14/679,316

(22) Filed: Apr. 6, 2015

(65) Prior Publication Data

US 2015/0235427 A1    Aug. 20, 2015

Related U.S. Application Data

(63) Continuation of application No. PCT/JP2014/002122, filed on Apr. 15, 2014.

(30) Foreign Application Priority Data

Jun. 19, 2013    (JP) ................................. 2013-128681

(51) Int. Cl.
*G06T 5/00*     (2006.01)
*G06T 19/00*    (2011.01)
*G02C 11/00*    (2006.01)

(52) U.S. Cl.
CPC ............ *G06T 19/006* (2013.01); *G02C 11/10* (2013.01); *G06T 5/006* (2013.01); *G06T 2207/10012* (2013.01); *G06T 2207/30201* (2013.01)

(58) Field of Classification Search
None
See application file for complete search history.

(56) References Cited

U.S. PATENT DOCUMENTS 9,197,864 B1*  11/2015  Starner ................. H04N 7/181
9,319,662 B2*   4/2016  Bathiche ........... H04N 13/0468
(Continued)

FOREIGN PATENT DOCUMENTS

CN         101943982 A      1/2011

OTHER PUBLICATIONS

International Search Report issued in PCT/JP2014/002122, dated Jul. 15, 2014, with English translation.
(Continued)

*Primary Examiner* — Xiao Wu
*Assistant Examiner* — Steven Elbinger
(74) *Attorney, Agent, or Firm* — McDermott Will & Emery LLP

(57) ABSTRACT

This invention solves the problem that objects in the field of view of reading glasses using multifocal lenses for correcting ocular refractive errors such as presbyopia appear distorted. This image display device is provided with the following: a distance computation unit that computes the distance to a subject in a field-of-view image; a visual-acuity-information acquisition unit that stores visual-acuity information for the user in advance; a corrected-image generation unit that generates and outputs a corrected image on the basis of the field-of-view image and an eye image generated from the field-of-view image, the distance information, and the visual-acuity information; and a display unit that displays the corrected image by superimposing same onto the user's field of view. Since the corrected image is
(Continued)

superimposed without the use of lenses, lenses being the cause of the abovementioned distortion, the user can see close objects clearly.

10 Claims, 18 Drawing Sheets

(56) References Cited

U.S. PATENT DOCUMENTS

| | | | |
|---|---|---|---|
| 2002/0101568 A1* | 8/2002 | Eberl | G02B 27/017 351/211 |
| 2005/0106355 A1* | 5/2005 | Kohlman | D06B 11/0059 428/85 |
| 2005/0128312 A1* | 6/2005 | Fredlund | H04N 1/02409 348/222.1 |
| 2011/0006978 A1* | 1/2011 | Yuan | G06F 3/013 345/156 |
| 2012/0019703 A1* | 1/2012 | Thorn | G06T 5/002 348/333.03 |
| 2012/0044260 A1* | 2/2012 | Hirai | H04N 13/0018 345/629 |
| 2012/0194514 A1* | 8/2012 | Sakaguchi | H04N 13/0011 345/419 |
| 2012/0262477 A1* | 10/2012 | Buchheit | G09G 5/00 345/619 |
| 2013/0050258 A1* | 2/2013 | Liu | G06F 17/3087 345/633 |
| 2013/0215147 A1* | 8/2013 | Hilkes | G02B 27/017 345/633 |
| 2014/0028549 A1 | 1/2014 | Yuan | |
| 2014/0137054 A1* | 5/2014 | Gandhi | G06F 3/013 715/865 |
| 2014/0306883 A1 | 10/2014 | Yuan | |
| 2015/0168723 A1* | 6/2015 | Eto | H04N 9/73 348/51 |

OTHER PUBLICATIONS

Office Action issued in corresponding Chinese Patent Application No. 201480002549.2, dated Dec. 4, 2017.

Search Report issued in corresponding Chinese Patent Application No. 201480002549.2, dated Nov. 23, 2017.

* cited by examiner

[Fig. 1]
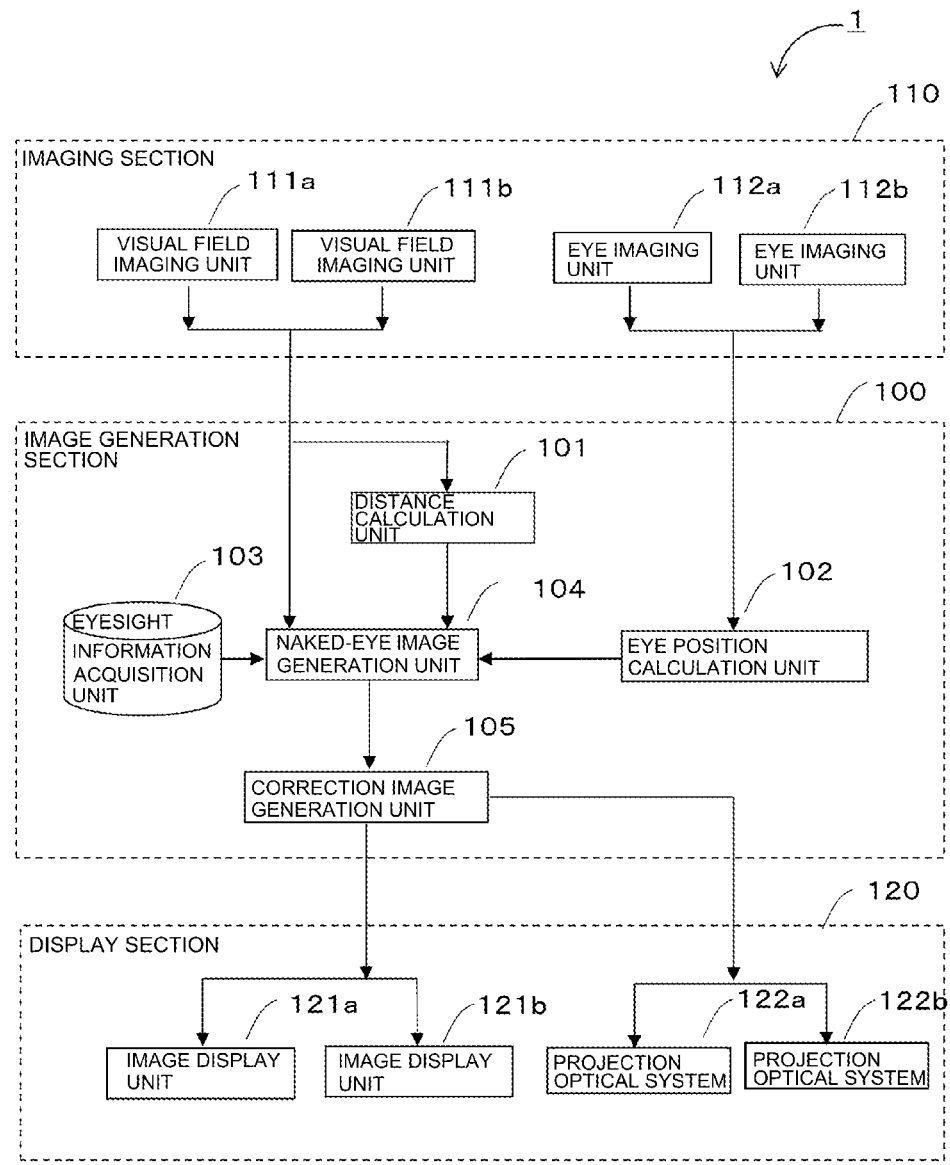

[Fig. 2]
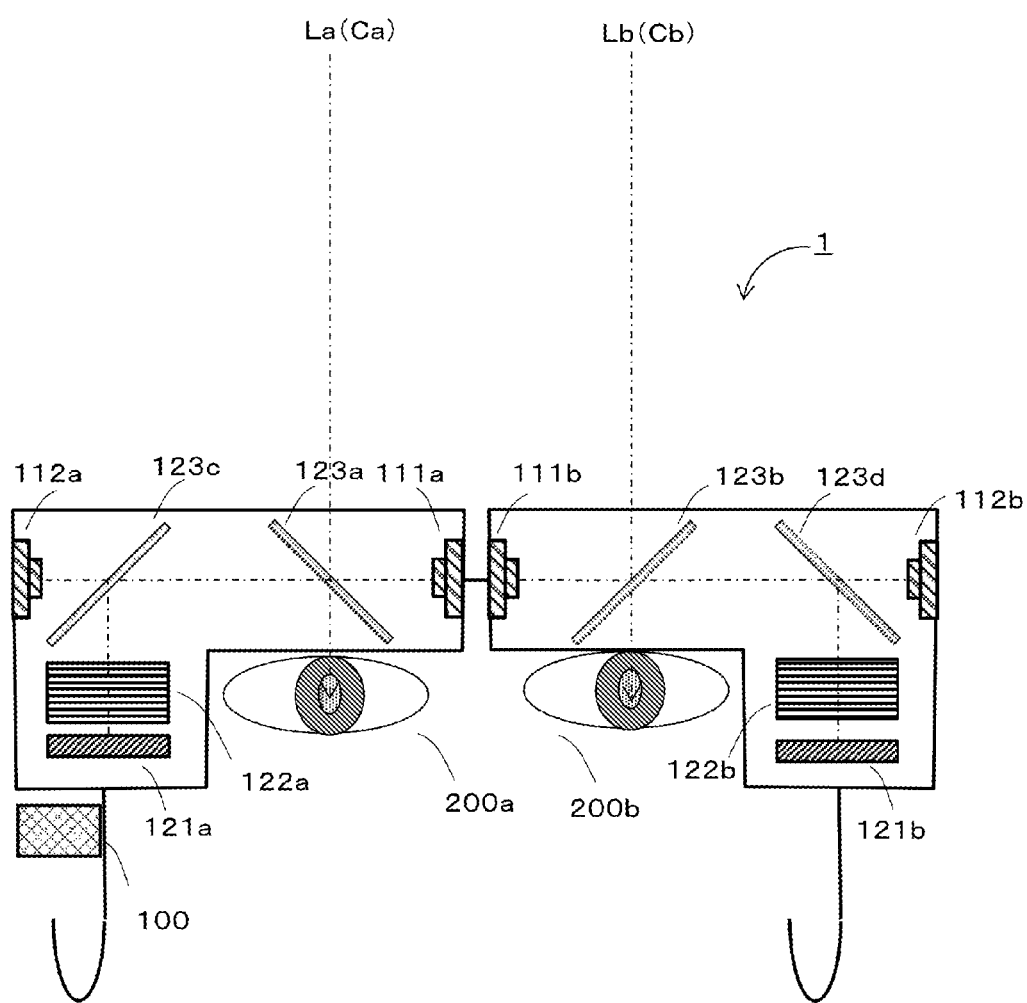

[Fig. 3]
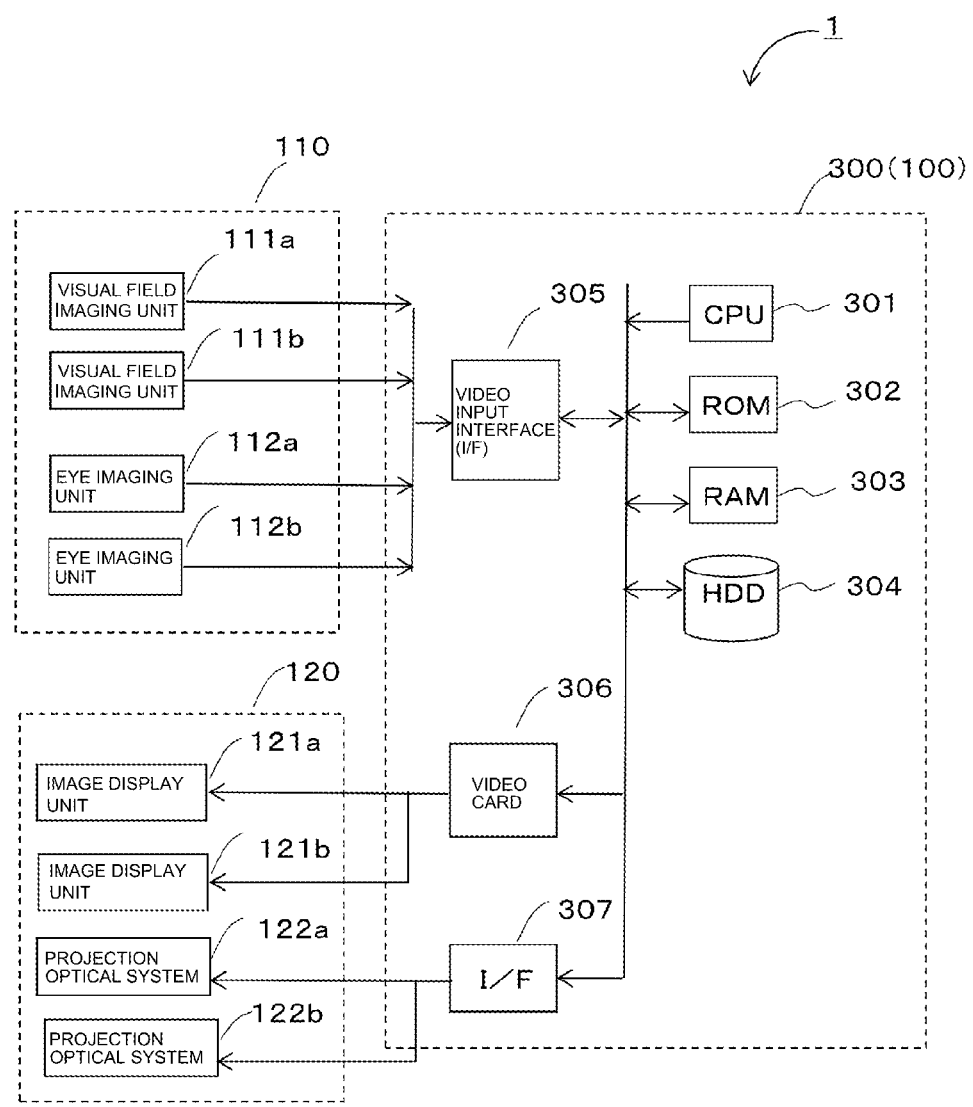

[Fig. 4]
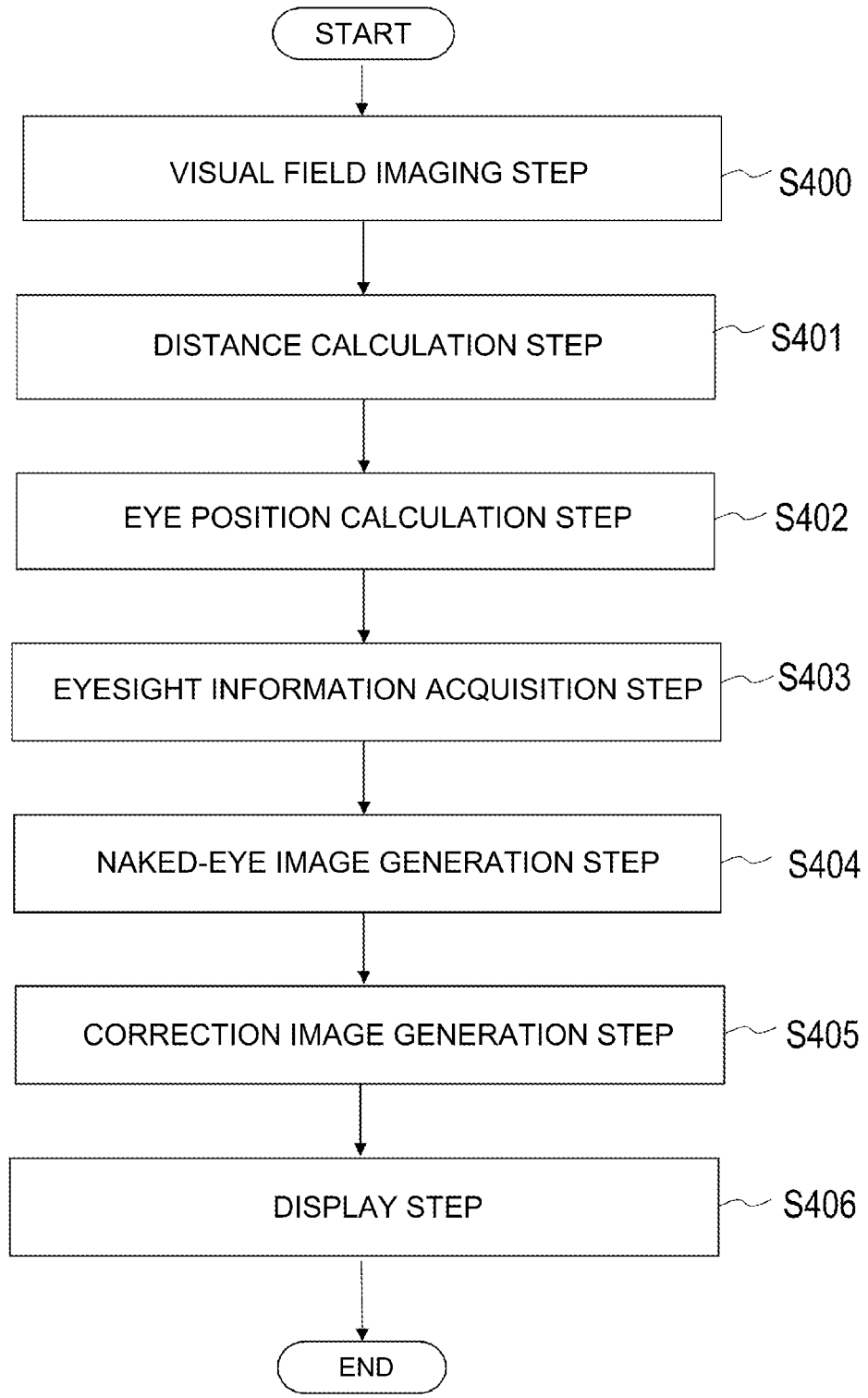

[Fig.5(a)]
[Fig.5(b)]
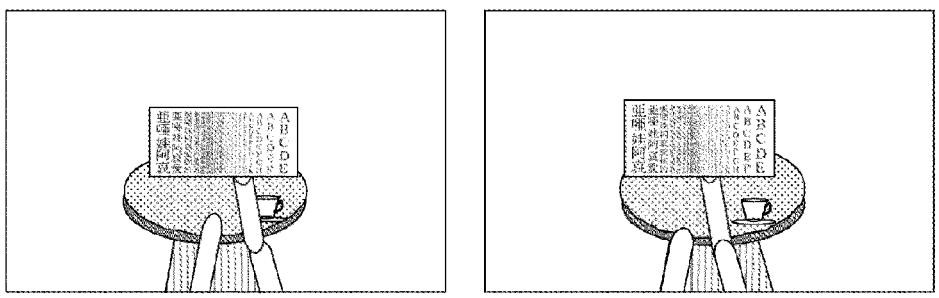
[Fig.5(c)]
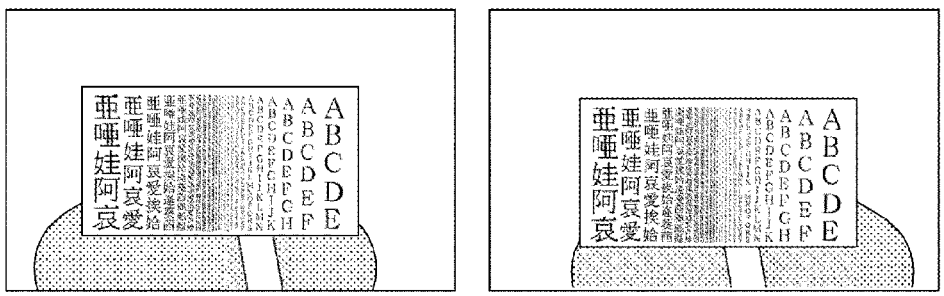

[Fig. 6]
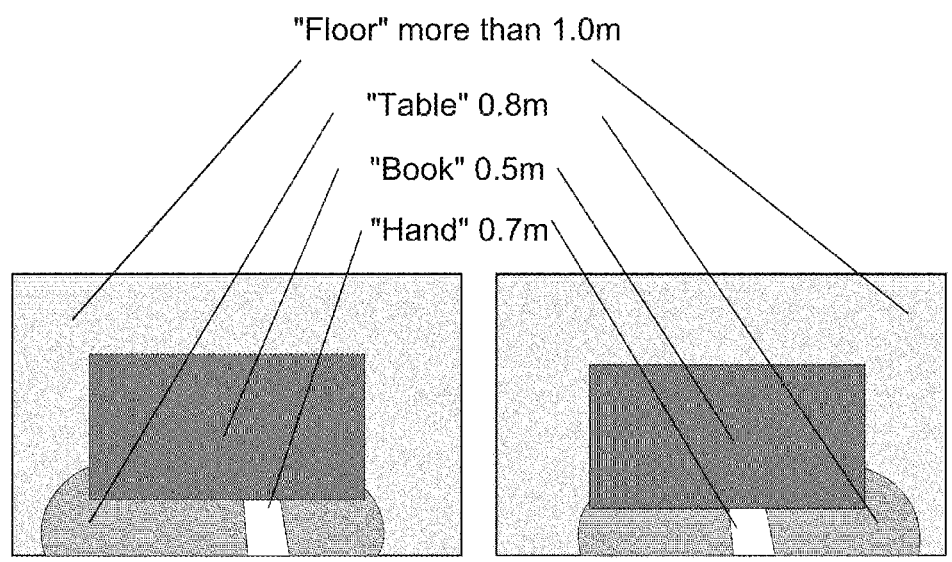

[Fig.7(a)]
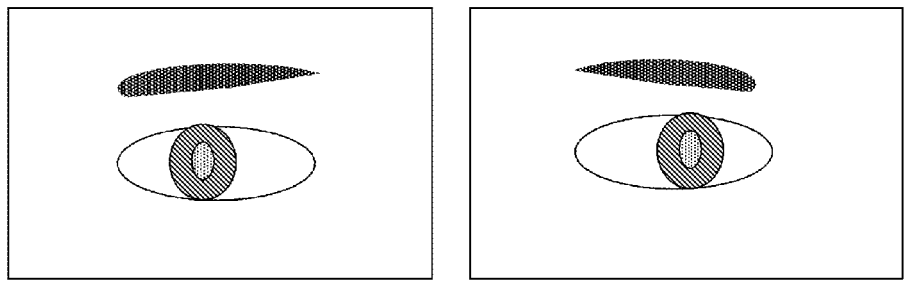
[Fig.7(b)]
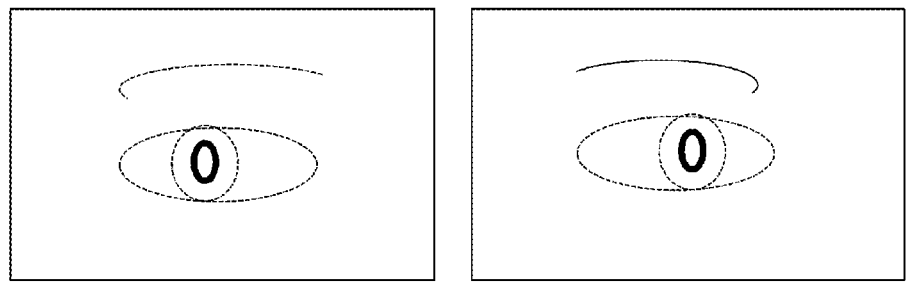
[Fig.7(c)]
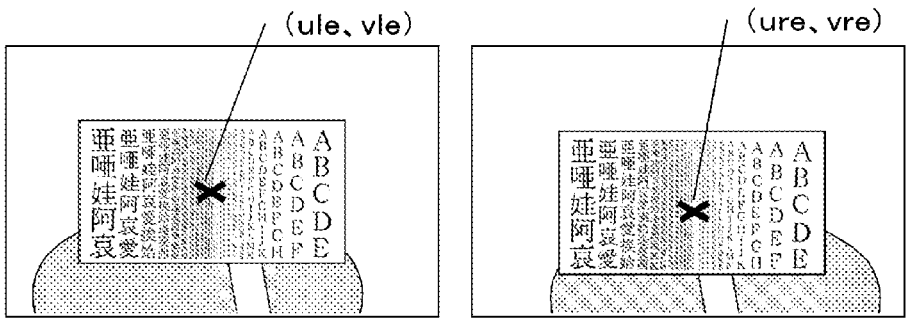

[Fig. 8]

| Distance d[m] | Parameter indicating an extent of blurring σ[pixel] | Diopter of sherical lens s[D] |
|---|---|---|
| >0.7 | 0.0 | 0.0 |
| 0.6 | 1.0 | 1.0 |
| 0.5 | 3.0 | 2.0 |
| 0.4 | 5.0 | 3.0 |
| <0.3 | 7.0 | 4.0 |

[Fig.9(a)]
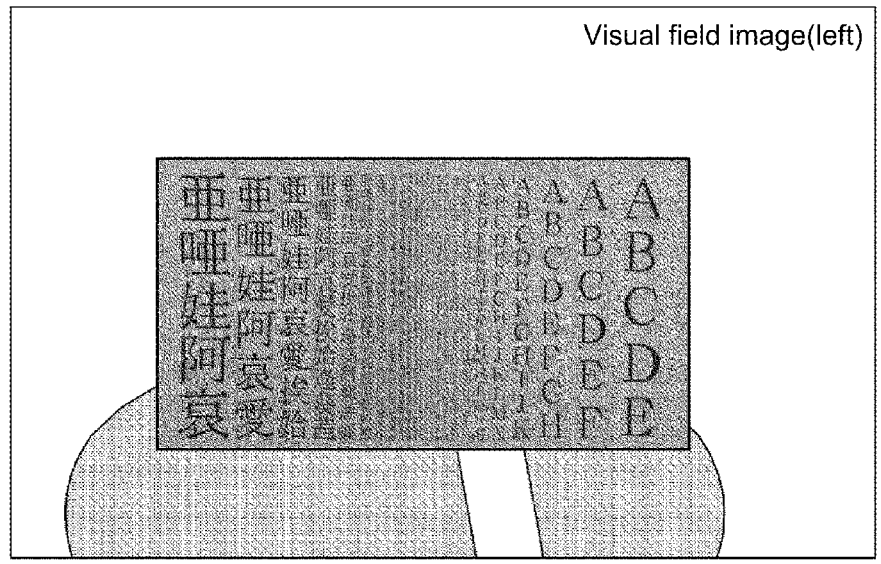
[Fig.9(b)]
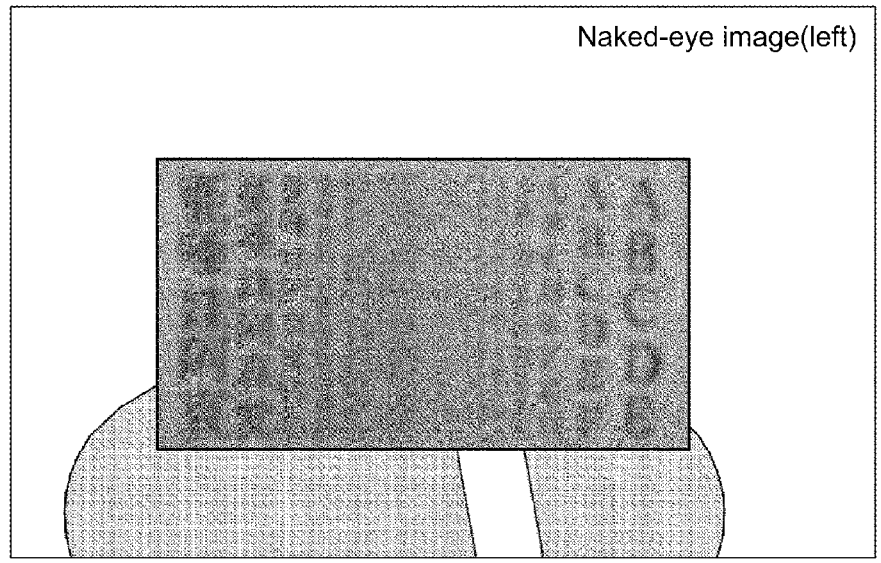

[Fig.10(a)]
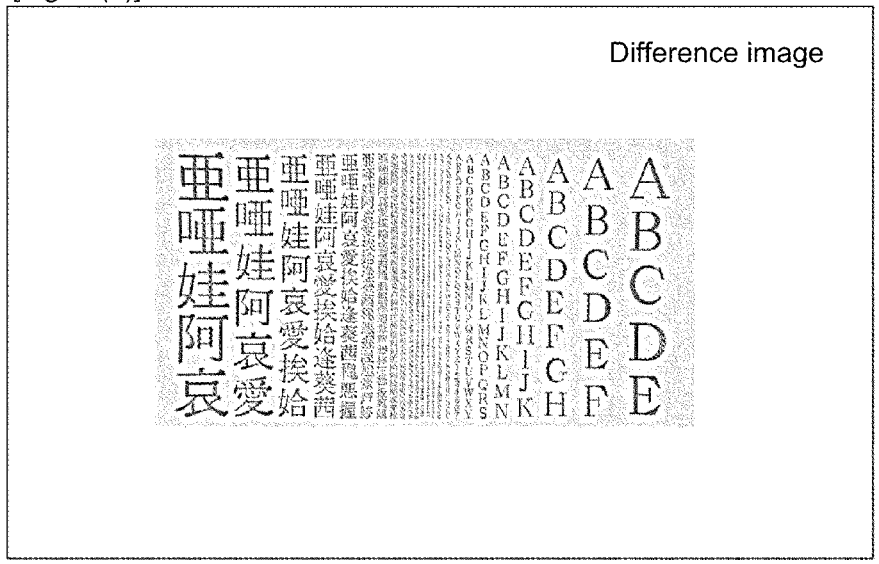
Difference image
[Fig.10(b)]
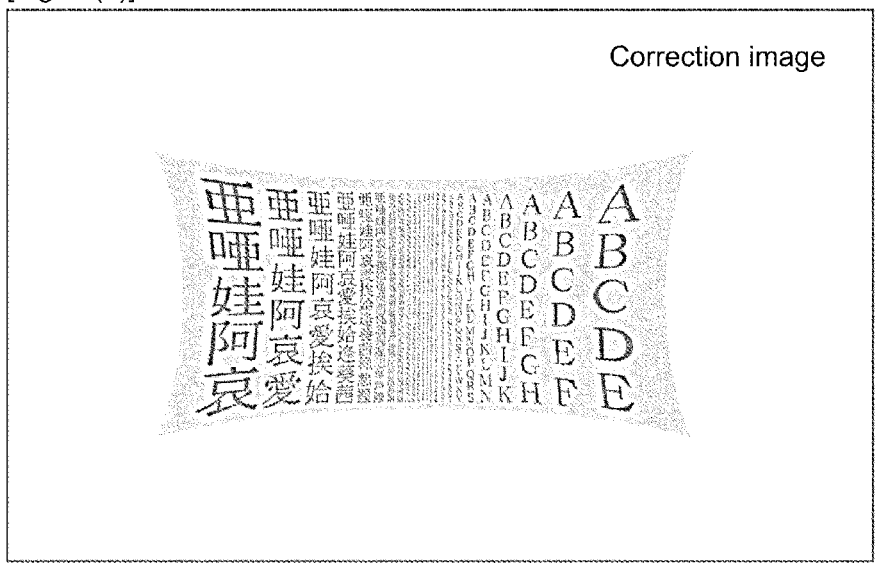
Correction image

[Fig.11(a)]
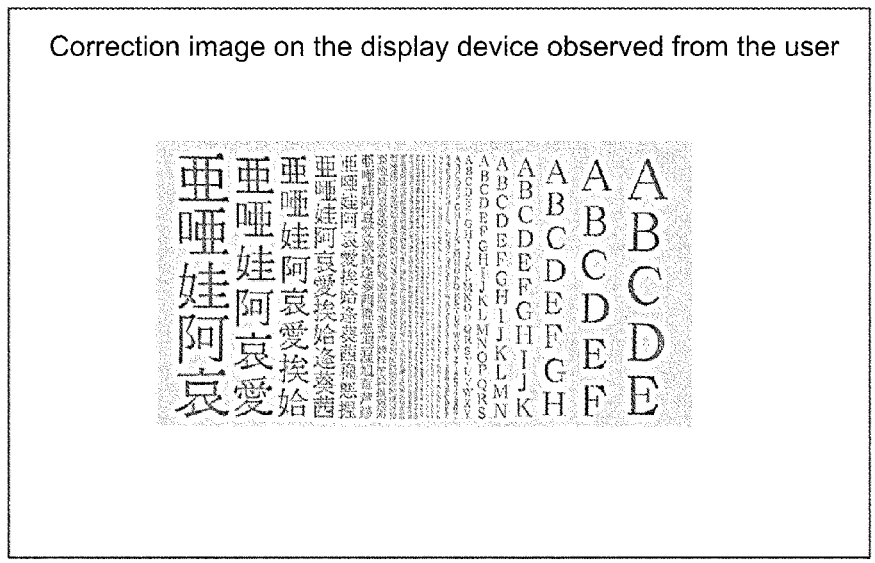
Correction image on the display device observed from the user
[Fig.11(b)]
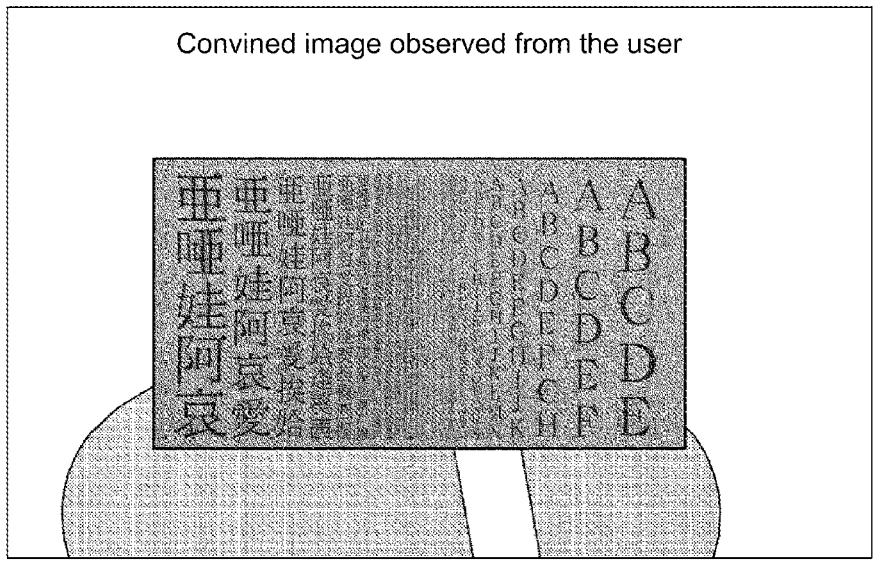
Convined image observed from the user

[Fig. 12]
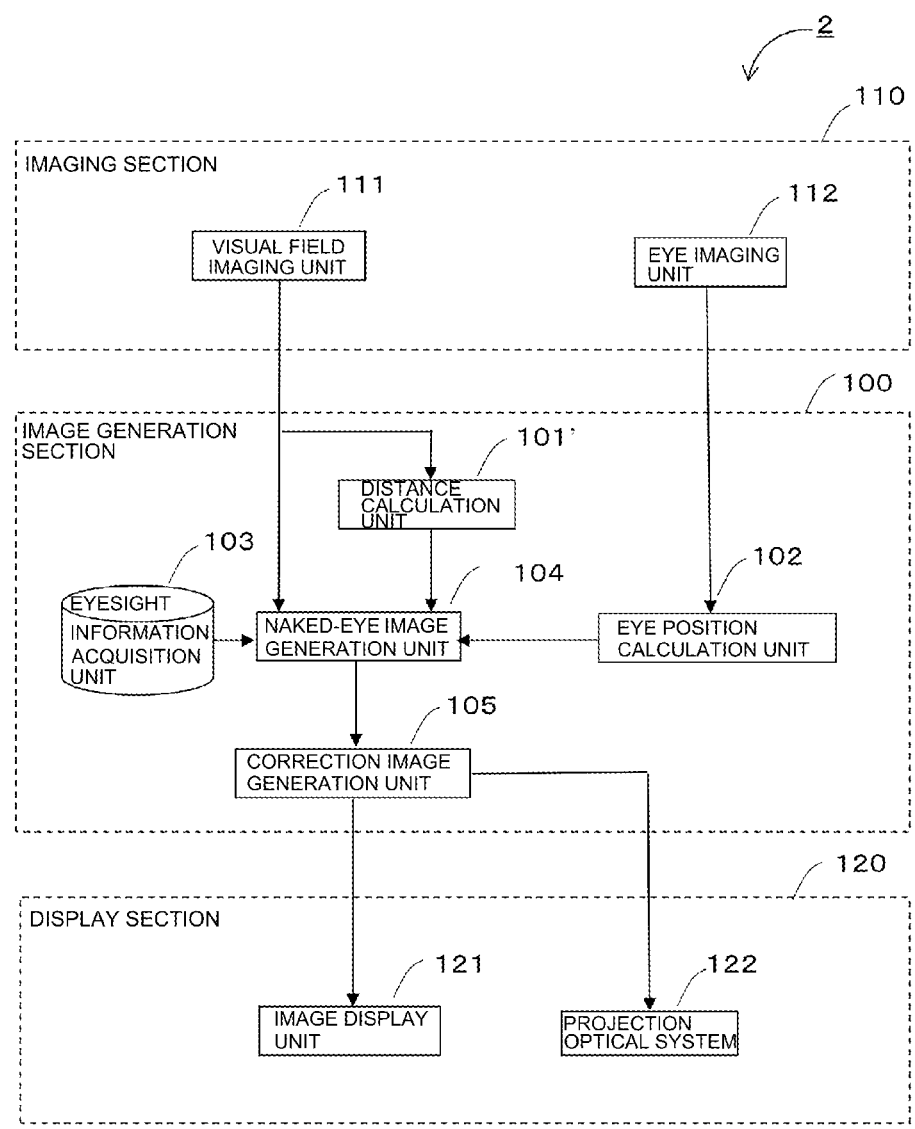

[Fig. 13]
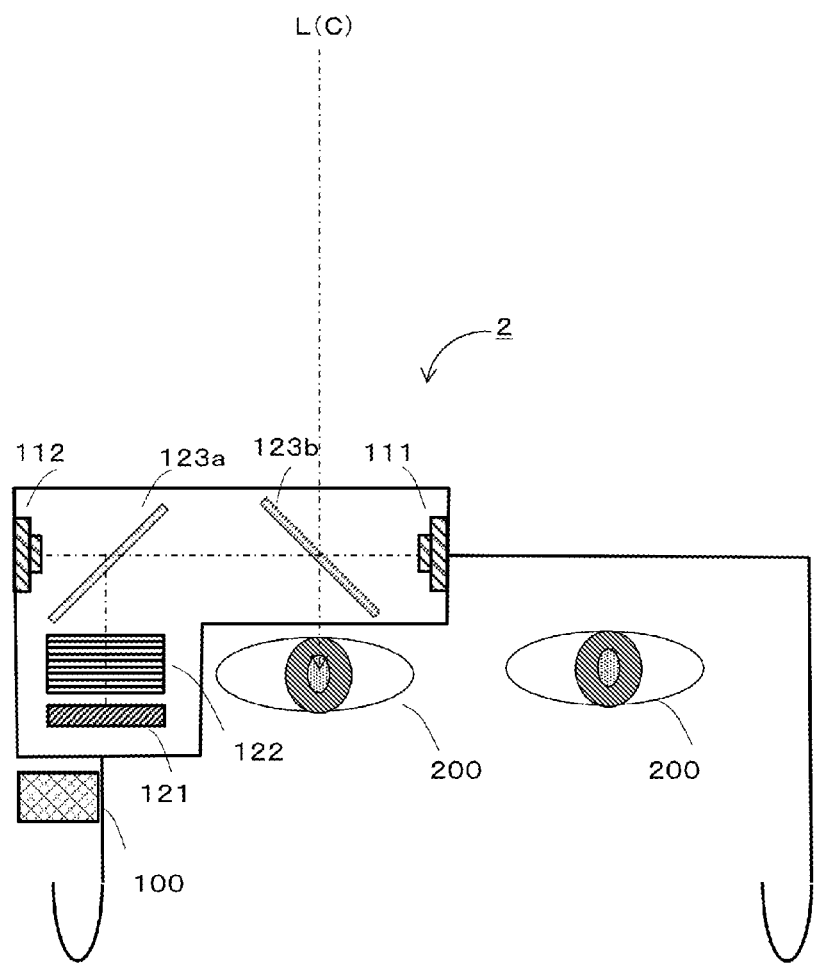

[Fig. 14]
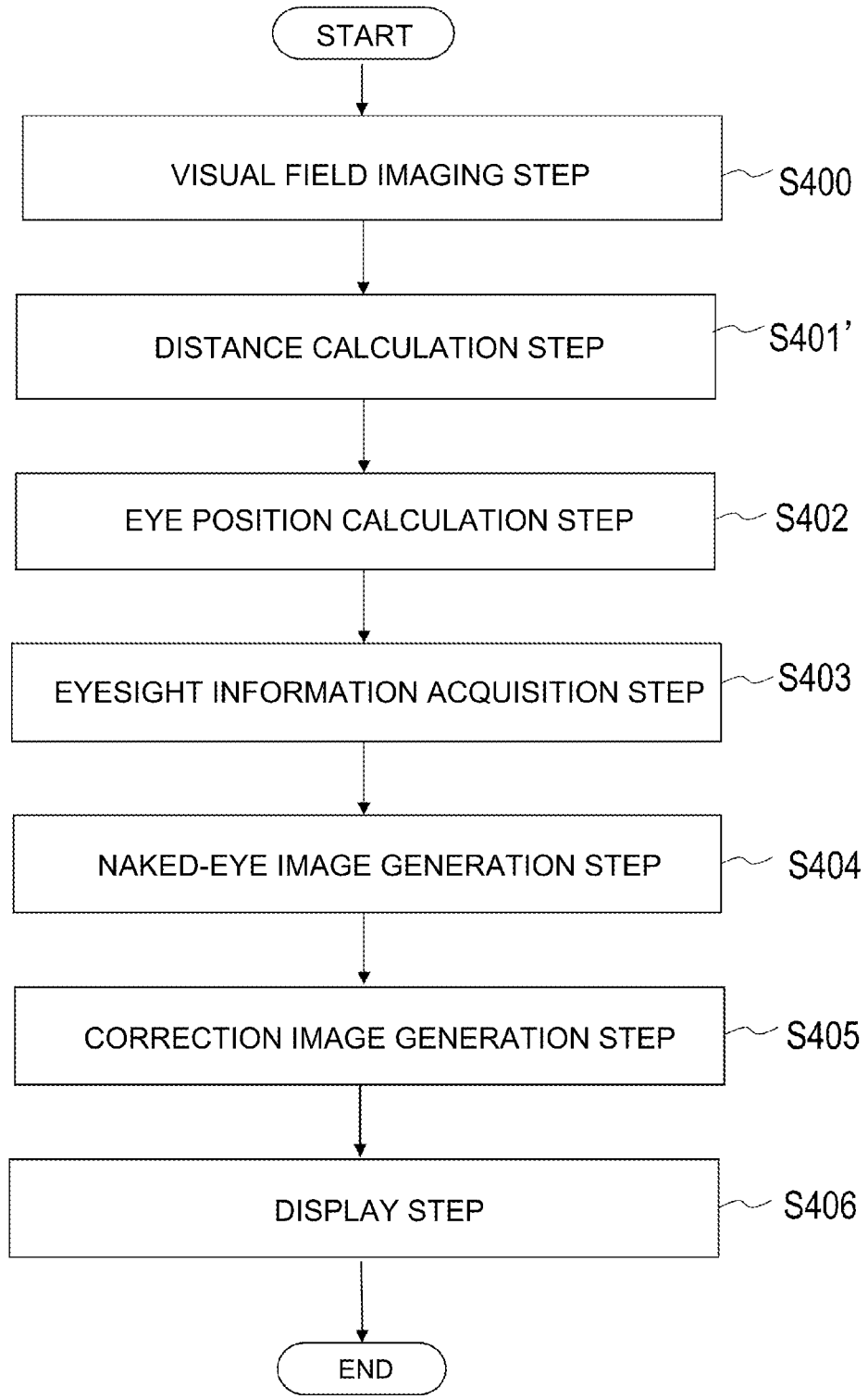

[Fig. 15]
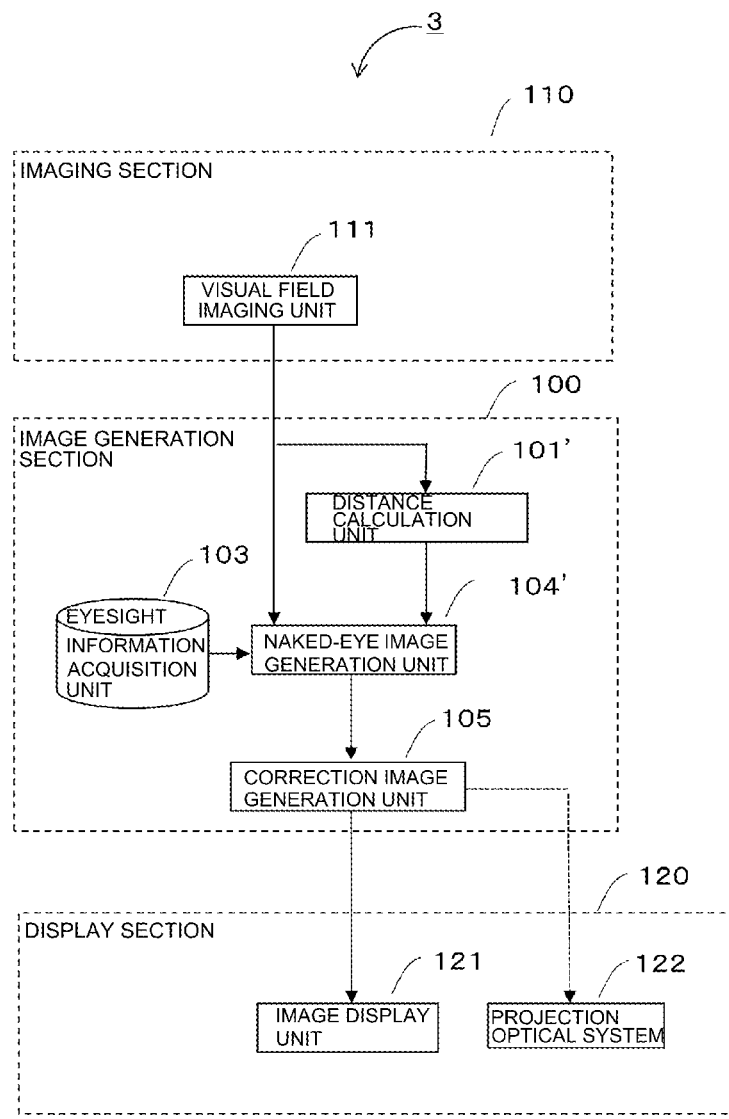

[Fig. 16]
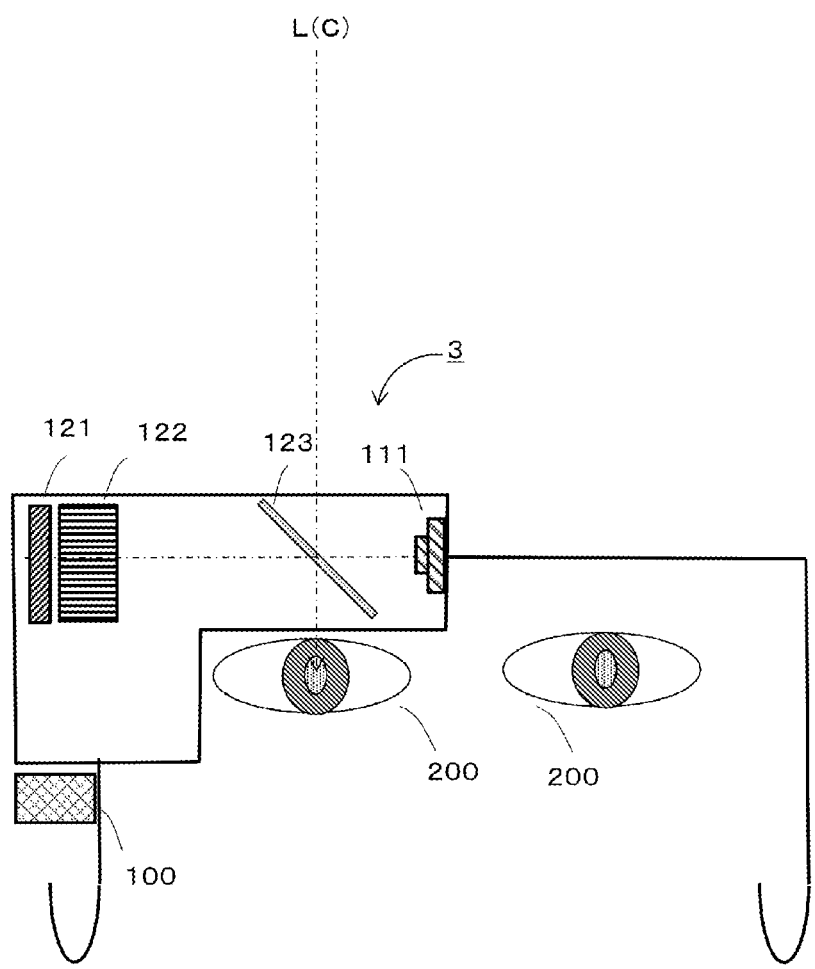

[Fig. 17]
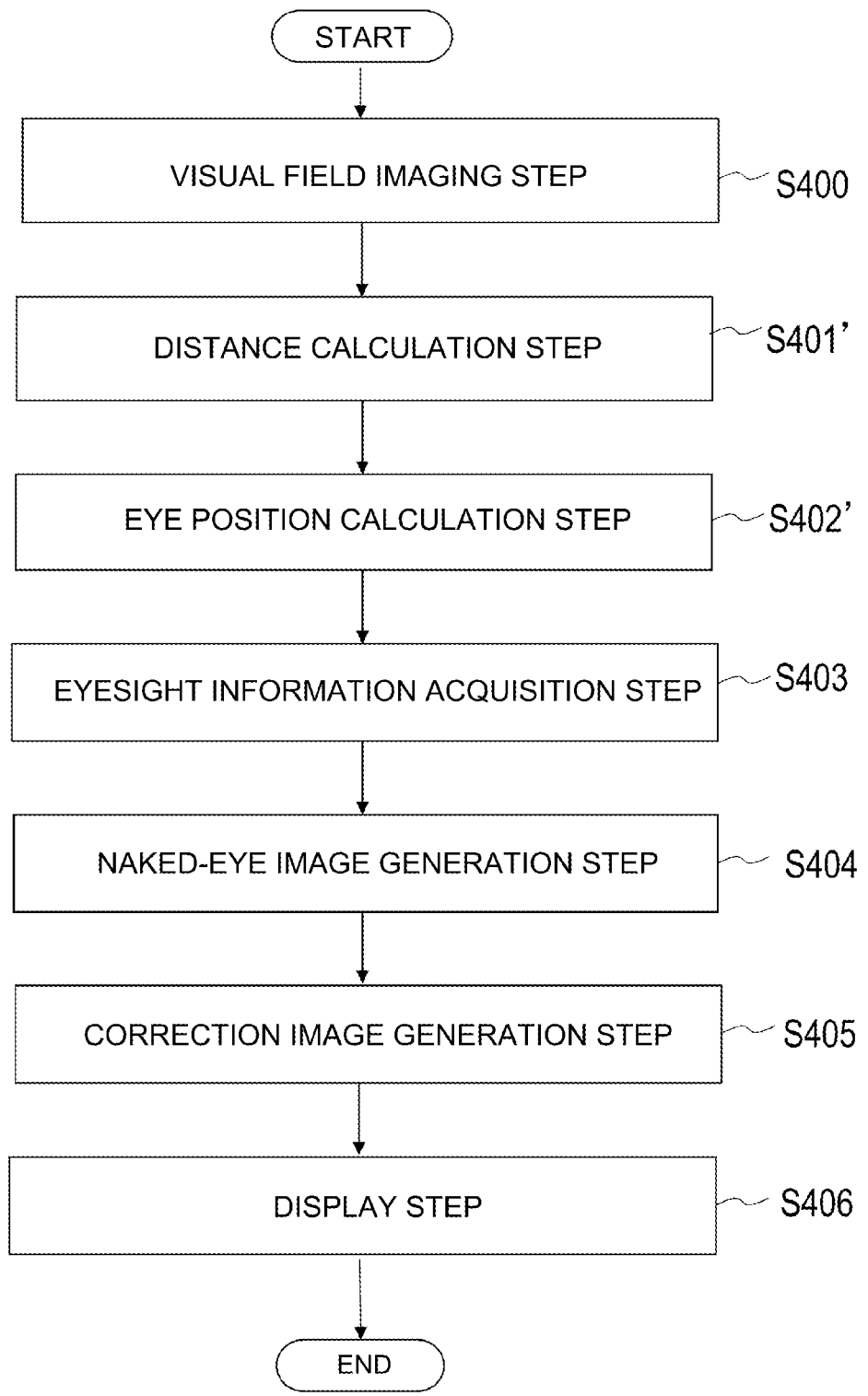

[Fig. 18]

| Distance d[m] | Parameter indicating an extent of blurring σ[pixel] | | Diopter of sherical lens s[D] | |
|---|---|---|---|---|
| | tf<60[sec] | tf≧60[sec] | tf<60[sec] | tf≧60[sec] |
| >0.7 | 0.0 | 0.0 | 0.0 | 0.0 |
| 0.6 | 1.0 | 0.5 | 1.0 | 0.5 |
| 0.5 | 3.0 | 2.0 | 2.0 | 1.5 |
| 0.4 | 5.0 | 4.0 | 3.0 | 2.5 |
| <0.3 | 7.0 | 6.0 | 4.0 | 3.5 |

[Fig. 19]

| Distance d[m] | Parameter indicating an extent of blurring σ[pixel] | Diopter of sherical lens s[D] |
|---|---|---|
| >2.0 | 3.0 | −3.0 |
| 1.0 | 2.0 | −2.0 |
| 0.7 | 1.0 | −1.0 |
| <0.5 | 0.0 | 0.0 |

CORRECTION OF DISPLAYED IMAGES FOR USERS WITH VISION ABNORMALITIES

RELATED APPLICATIONS

This application is a continuation of International Application No. PCT/JP2014/002122, filed on Apr. 15, 2014, which in turn claims the benefit of Japanese Application No. 2013-128681, filed on Jun. 19, 2013, the disclosures of which Applications are incorporated by reference herein.

TECHNICAL FIELD

The present invention relates to an image display device, and particularly to a head mounted type or spectacle type image display device which overlaps an image displayed on a display section mounted on a user's head or the like on a user's visual field so as to enable the user to see an object clearly, targeting a person which cannot see an object clearly due to ametropia such as presbyopia, myopia, or hyperopia.

BACKGROUND ART

Due to the abnormality of a refractive index of the lens or deterioration in adjustment performance thereof, the abnormality of a form of the eyeball, or the like, ametropia of an eye such as presbyopia, myopia, or hyperopia occurs. Among them, the presbyopia refers to a state in which adjustment performance of the lens is weakened by aging and thus the lens cannot focus on a near object. In order to correct the presbyopia, presbyopia spectacles formed of convex lenses are mainly used. If the presbyopia spectacles are used, a near object can be seen clearly, but there is a problem in that a far object cannot be seen clearly. In addition, in order to solve this problem, the presbyopia spectacles are worn when a near object is seen, and the presbyopia spectacles are taken off when a far object is seen, but there is a problem in that this is troublesome.

In relation to this problem, as spectacles which correct the presbyopia and also enable a far object to be seen clearly, there are so-called bifocal spectacles in which lenses with different degrees for far sight and near sight are combined with each other. For example, PTL 1 discloses bifocal spectacles in which a degree for far sight is used in the entire lens, and a degree for near sight is used at a part of a lower side of the lens. If these spectacles are used, a near object and a far object can be seen clearly with a pair of spectacles. However, since the degrees for far sight and near sight are discontinued at a boundary thereof, there is a problem in that an object is seen doubly around the boundary.

In contrast, PTL 2 discloses progressive multi-focal spectacles in which a degree gradually changes when coming toward a lower side of a lens. In these spectacles, degrees for far sight and near sight continuously change at a boundary thereof, and thus the discontinuity does not occur at the boundary.

In addition, PTLs 3 and 4 disclose varifocal spectacles which include lenses of which degrees (refractive indexes) can be changed and a control unit for changing the degrees. If these spectacles are used, a near object and a far object can be seen clearly with a pair of spectacles.

CITATION LIST

Patent Literature

[PTL 1] JP-B-58-48885 (Japanese Patent No. 1217078)
[PTL 2] JP-A-62-90601
[PTL 3] JP-A-2007-052116
[PTL 4] JP-A-2009-098649

SUMMARY OF INVENTION

Technical Problem

However, in the above-described bifocal spectacles, the degree of the lens differs depending on directions in which a wearer is looking, or the degree of the lens changes over time, and thus there is a problem in that an object is seen to be distorted. For example, in the bifocal spectacles, an object around the boundary is seen doubly. In the progressive multi-focal spectacles, an object is seen to be nonuniformly distorted, such as a straight line looking like curves with different curvatures depending on locations. In addition, in the varifocal spectacles, when the degree changes, a size, a position, and a shape of an object appear distorted so as to change over time. For this reason, there is a problem in that a user feels that a visual field thereof shakes or feels that the eyes get tired easily.

An object of the present invention is to provide an image display device which enables a person who has ametropia of the eye such as presbyopia to see both a near object and a far object clearly and to see an object without distortion when the person uses the image display device.

Solution to Problem

The present invention has been made in order to solve the above-described problems.

A first invention of the present application is the following invention. In addition, in this part, the invention refers to the invention disclosed in the specification at the filing of the present application.

A head mounted type or spectacle type image display device which displays images in a visual field of a user in an overlapping manner so that the user can clearly see a subject within the visual field, the image display device including:

a visual field imaging unit that captures and outputs a visual field image which is an image of the visual field of the user;

a distance calculation unit that receives the visual field image, and calculates a distance between the subject in the visual field image and the visual field imaging unit so as to output as distance information;

an eyesight information acquisition unit that acquires eyesight information which is information regarding eyesight of the user;

a correction image generation unit that generates and outputs a correction image on the basis of the visual field image, the distance information, and the eyesight information; and a display unit that receives the correction image, and displays the correction image of the subject within the visual field of the user in an overlapping manner.

According to this configuration, a user sees an object without using a lens, and can thus see the object without distortion. In addition, regarding a near object which cannot be seen clearly without using spectacles due to presbyopia, the near object is observed in a state of overlapping a correction image and can thus be seen clearly.

The "visual field" indicates a range in which the user can visually recognize an object with the eyes thereof.

The "subject" is a target object on which the eyes of the user are intended to be focused.

"Being able to see an object clearly" indicates that the user can see a target object more clearly than in a case where the user does not wear the image display device.

The "eyesight information" indicates information regarding the eyesight of the user, and includes information regarding the eyesight under a certain condition and information regarding a change in the eyesight over time.

"Generating the correction image on the basis of the visual field image, the distance information, and the eyesight information" is not limited to a case of directly generating the correction image by using the information and the like, and also includes a case of generating the correction image by using other images which have been generated by using the information and the like.

"Displaying in an overlapping manner" indicates that the display is performed so that the user can visually recognize the subject in a state in which the correction image overlaps an image of the subject which is directly seen by the user. Consequently, the user can recognize an image obtained when the image of the subject which is directly seen and the correction image are projected on the retina in an overlapping manner, as a retinal image.

A second invention of the present application is the following invention.

The image display device according to the first invention, further including:

a naked-eye image generation unit that receives the visual field image, the distance information, and the eyesight information, and generates and outputs a naked-eye image which is an image in a case where the user sees the subject, in which the correction image generation unit receives the visual field image and the naked-eye image, and generates and outputs the correction image on the basis of the visual field image and the naked-eye image.

The "naked-eye image" indicates an image (retinal image) of the subject which is seen by the user with the eyes thereof.

A third invention of the present application is the following invention.

The image display device according to the second invention, in which the correction image generation unit generates and outputs the correction image on the basis of an image obtained by adding a constant value to a difference image between the visual field image and the naked-eye image.

A fourth invention of the present application is the following invention.

The image display device according to the second invention, further including:

an eye position calculation unit that calculates a position and a posture of each eye of the user including a visual line of the user so as to output eye position information, in which the naked-eye image generation unit receives the visual field image, the distance information, the eyesight information, and the eye position information, calculates a gaze point distance which is a distance between a gaze point of the subject on the visual line of the user and each eye of the user, and generates and outputs the naked-eye image in a case where the user sees the gaze point.

The "gaze point" indicates an intersection between the visual line of the user and the subject.

A fifth invention of the present application is the following invention.

The image display device according to the fourth invention, in which the display unit includes a projection optical system that displays an image at a predetermined distance within the visual field of the user in an overlapping manner, in which the naked-eye image generation unit outputs the gaze point distance, in which the correction image generation unit generates and outputs the correction image on the basis of the visual field image, the naked-eye image, and the gaze point distance, and in which the projection optical system controls an optical system so that the correction image is displayed so as to overlap the subject located at the gaze point.

A sixth invention of the present application is the following invention.

The image display device according to the first invention, in which the visual field imaging unit is disposed so that an optical axis thereof in a real space matches the visual line of the user when the user faces the front.

A seventh invention of the present application is the following invention.

The image display device according to the fourth invention, in which the visual field imaging unit is a light field camera which captures multi-viewpoint images and can reconfigure an image from any viewpoint, and in which the visual field imaging unit is disposed so as to match the visual line of the user when the user faces the front, and receives visual line information of the user calculated by the eye position calculation unit so as to reconfigure an image of the visual line of the user and to output as the visual field image.

An eighth invention of the present application is the following invention.

The image display device according to the first invention, in which the correction image generation unit makes the correction image bright in a case where the visual field of the user is dark.

A ninth invention of the present application is the following invention.

The image display device according to the first invention, in which the eyesight information includes information regarding a change in the eyesight of the user over time.

A tenth invention of the present application is the following invention.

The image display device according to the ninth invention, in which the eyesight information includes information regarding a relationship between an elapsed time after the user starts to gaze at the subject at a predetermined distance and a change in an extent of focus blurring, and in which the naked-eye image generation unit generates the naked-eye image on the basis of the eyesight information and a change in the gaze point distance.

An eleventh invention of the present application is the following invention.

The image display device according to the ninth invention, in which the eyesight information includes information regarding a relationship between an elapsed time after the visual field of the user changes from a bright state to a dark state and a change in brightness of an image visually recognized by the user, and in which the naked-eye image generation unit generates the naked-eye image on the basis of the eyesight information and a change in the brightness of the image within the visual field.

In addition, the present invention can be realized not only as an image display device including the characteristic processing units but also as an image display method with the characteristic processing units included in the image display device as steps.

A twelfth invention of the present application is the following invention.

A image display method of displaying images in a visual field of a user in an overlapping manner so that the user can clearly see a subject within the visual field, the method including:

a visual field imaging step of capturing and outputting a visual field image which is an image of the visual field of the user;

a distance calculation step of receiving the visual field image, and calculating a distance between the subject in the visual field image and the visual field imaging unit so as to output as distance information;

an eyesight information acquisition step of acquiring eyesight information which is information regarding eyesight of the user;

a correction image generation step of generating and outputting a correction image on the basis of the visual field image, the distance information, and the eyesight information; and a display step of receiving the correction image, and displaying the correction image of the subject within the visual field of the user in an overlapping manner.

In addition, the present invention is realized as a program which causes a computer to execute the characteristic steps included in the image display method. Further, needless to say, the program can be distributed by using a computer readable recording medium such as a compact disc-read only memory (CD-ROM) or via a communication network such as the Internet.

A thirteenth invention of the present application is the following invention.

A program causing a computer to execute each of the steps included in the image display method according to the twelfth invention.

Advantageous Effects of Invention

According to the present invention, a near object which cannot be seen clearly due to ametropia such as presbyopia can be seen clearly when observed in a state of overlapping a correction image for correcting blurring due to the presbyopia. In addition, a user sees an object without using a lens and can thus see the object without distortion. As a result, a presbyopic person can see both a near object and a far object, and also can see the object without distortion.

BRIEF DESCRIPTION OF DRAWINGS

FIG. 1 is a block diagram illustrating a configuration of an image display device in Embodiment 1.

FIG. 2 is a schematic diagram illustrating a structure of an optical system of the image display device in Embodiment 1.

FIG. 3 is a block diagram illustrating a configuration of the image display device including an image generation section constituted by a computer.

FIG. 4 is a flowchart illustrating an operation procedure of the image generation section of Embodiment 1.

FIG. 5(a) is a schematic diagram illustrating an example of use circumstances in Embodiment 1; FIG. 5(b) is a schematic diagram illustrating a user's visual field in Embodiment 1; and FIG. 5(c) is a schematic diagram illustrating a visual field image captured by a visual field imaging unit in Embodiment 1.

FIG. 6 is a schematic diagram illustrating an example of a distance image corresponding to the visual field image in Embodiment 1.

FIG. 7(a) through 7(c) illustrate images and an example of eye position information in Embodiment 1, in which FIG. 7(a) is a schematic diagram illustrating left eye and right eye images, FIG. 7(b) is a schematic diagram illustrating an estimation result of iris positions, FIG. 7(c) is a schematic diagram illustrating an estimation result of gaze point positions on the visual field images.

FIG. 8 is a diagram illustrating an example of eyesight information in a case where a user is presbyopic.

FIGS. 9(a) and 9(b) illustrate examples of a visual field image and a naked-eye image, in which FIG. 9(a) illustrates a visual field image (left), and FIG. 9(b) illustrates a naked-eye image (left).

FIGS. 10(a) and 10(b) illustrate examples of displayed images, in which FIG. 10(a) illustrates a difference image, and FIG. 10(b) illustrates a correction image.

FIGS. 11(a) and 11(b) illustrate examples of images observed by a user, in which FIG. 11(a) illustrates a correction image on the display device observed from the user, and FIG. 11(b) illustrates a combined image observed from the user.

FIG. 12 is a block diagram illustrating a configuration of an image display device in Embodiment 2.

FIG. 13 is a schematic diagram illustrating a structure of an optical system of the image display device in Embodiment 2.

FIG. 14 is a flowchart illustrating an operation procedure of the image generation section of Embodiment 2.

FIG. 15 is a block diagram illustrating a configuration of an image display device in Embodiment 3.

FIG. 16 is a schematic diagram illustrating a structure of an optical system of the image display device in Embodiment 3.

FIG. 17 is a flowchart illustrating an operation procedure of the image generation section of Embodiment 3.

FIG. 18 is a diagram illustrating an example of eyesight information of a user in Embodiment 4.

FIG. 19 is a diagram illustrating an example of eyesight information in a case where a user is myopic.

DESCRIPTION OF EMBODIMENTS

Embodiment 1

Hereinafter, Embodiment 1 of the present invention will be described with reference to the drawings.

FIG. 1 is a block diagram illustrating a configuration of an image display device 1 in Embodiment 1. As illustrated in FIG. 1, the image display device 1 in Embodiment 1 includes an imaging section 110, an image generation section 100, and a display section 120. The imaging section 110 includes left and right two visual field imaging units 111a and 111b, and left and right two eye imaging units 112a and 112b. The image generation section 100 includes a distance calculation unit 101, an eye position calculation unit 102, an eyesight information acquisition unit 103, a naked-eye image generation unit 104, and a correction image generation unit 105. The display section 120 includes left and right two image display units 121a and 121b, and left and right two projection optical systems 122a and 122b. In addition, the subscripts a to d are used to differentiate the same members from each other; however, in the following description, only the reference numerals are used without the subscripts in a case where the members are not required to be differentiated from each other.

FIG. 2 is a schematic diagram illustrating an arrangement of an optical system of the image display device 1 in Embodiment 1. FIG. 2 illustrates a state in which a user wears the spectacle-like present device viewed from above, and illustrates the eyes 200 of the user and an arrangement of the optical system of the image display device 1. The two visual field imaging units 111a and 111b are disposed so that imaging ranges of the visual field imaging units 111 respectively include a part of a visual field of the user via half mirrors 123a and 123b. In addition, the two eye imaging units 112a and 112b are disposed so that imaging ranges of the eye imaging units 112a and 112b respectively include the eyes 200a and 200b of the user via half mirrors 123c and 123d. Further, the two image display units 121a and 121b are disposed so that the image display units 121 are included in the visual field of the user via the projection optical system 122a and 122b and the half mirrors 123a and 123c, and 123b and 123d. The respective units are disposed so that optical axes of the visual field imaging units 111, optical axes of the eye imaging units 112, and optical axes of the projection optical system 122 match each other.

The visual field imaging units 111a and 111b are disposed so that optical axes Ca and Cb thereof in the real space respectively match visual lines La and Lb of the eyes 200a and 200b when the user faces the front. Here, the visual lines of the eyes 200 when the user faces the front refer to visual lines in a case where the user sees a subject at a sufficiently far position in the front direction.

The visual field imaging units 111 which image visual fields may employ light field cameras which can capture a multi-viewpoint image and reconfigure an image from a certain viewpoint. In the case, the light field cameras are disposed so as to match visual lines in a case where the user faces the front, and may reconfigure images of user's visual lines by receiving a user's visual line information calculated by the eye position calculation unit 102, and may output the images as visual line images.

In FIG. 2, it is assumed that the left and right visual field imaging units 111a and 111b are respectively disposed at the optically same positions as those of the left eye and right eye of the user. Here, optical positions of the imaging section 110 (a camera; refer to FIG. 1) including the visual field imaging units 111 and the eye imaging units 112 and the eyes 200 or distances therebetween refer to positions or distances with respective focal positions as references. In other words, the imaging section 110 and the eyes 200 being disposed at the optically same position indicates that focal positions and directions of optical axes of both thereof match each other. In addition, in a case where the user gazes at a subject in a state of wearing the image display device 1, it is assumed that the visual field imaging units 111 are disposed so that visual lines of the user match imaging directions thereof.

The image display device 1 in Embodiment 1 captures images of visual fields of the user by using the imaging section 110, generates correction images from the captured images by using the image generation section 100, and displays the correction images on the visual fields of the user in an overlapping manner by using the display section 120.

First, the left and right two visual field imaging units 111 capture images including visual field ranges of the user via the half mirrors 123, so as to output left and right two images (hereinafter, these images are referred to as visual field images).

The left and right two eye imaging units 112 respectively capture images of the vicinities of the left and right eyes of the user via the half mirrors 123, so as to output left and right two images (hereinafter, these images are referred to as eye images).

Next, the distance calculation unit 101 receives the left and right two visual field images output from the visual field imaging units 111, and estimates parallax between the visual field images. In addition, distances between subjects in the visual field images and the visual field imaging units 111 are calculated on the basis of the estimated parallax and position information, obtained in advance, regarding the two visual field imaging units 111 (a distance therebetween or the like), and are output as distance information.

The eye position calculation unit 102 receives the left and right two eye images output from the eye imaging units 112, and estimates positions and postures of the left and right eyes of the user from the respective eye images so as to output as eye position information. It is possible to detect visual lines of the user on the basis of the output information. The eyesight information acquisition unit 103 stores in advance eyesight information which is information regarding eyesight of the user. In addition, the eyesight information acquisition unit 103 may have a configuration in which the eyesight information is not stored in advance but is acquired via a communication line or the like.

Next, the naked-eye image generation unit 104 receives the visual field images output from the visual field imaging units 111, the distance information calculated by the distance calculation unit 101, the eye position information output from the eye position calculation unit 102, and the eyesight information acquired from the eyesight information acquisition unit 103, and calculates gaze point positions of the user on the basis of the distance information and the eye position information. In addition, the naked-eye image generation unit 104 calculates gaze point distances which are distances between gaze points and the eyes on the basis of the calculated gaze point positions. Further, naked-eye images are generated and output, which are predicted values of images which are projected onto the retinae of the user in a case where the user directly observes a subject in the visual field images on the basis of the gaze point distances, the visual field images, the distance information, and the eyesight information. Consequently, it is possible to generate the naked-eye images corresponding to the gaze point distances.

Next, the correction image generation unit 105 receives the naked-eye images and the gaze point distances output from the naked-eye image generation unit 104 and the visual field images output from the visual field imaging units 111, and generate correction images by using the visual field images and the eyesight information on the basis of differences between clear vision images which are predicted values of images projected onto the retinae in a case where eyesight is corrected so that the user can see a subject on the gaze points clearly, and the naked-eye images.

In the present embodiment, a description has been made of a case where the correction image generation unit 105 uses the naked-eye images generated by the naked-eye image generation unit 104. However, there may be a configuration in which the correction image generation unit 105 creates image data by using the visual field images, the distance information, and the eyesight information, and generates correction images.

In addition, the correction image generation unit 105 calculates and outputs control information for controlling the projection optical system 122 so that the gaze point distances from the eyes 200 of the user to the subject on the gaze points match projection distances of the image display units 121 on the basis of position information of the projection optical system 122 and the image display units 121, obtained in advance.

Next, the projection optical system 122 is controlled by a projection optical system control unit (not illustrated) so that the gaze point distances between the eyes 200 of the user and gaze points which are focused points match optical distances between the eyes 200 of the user and the image display units 121. As mentioned above, the eye positions are detected by the eye position calculation unit 102, and thus it is possible to generate correction images in accordance with the gaze point distances and thus to control the projection optical system 122.

Finally, the left and right two image display units 121 respectively display the left and right two correction images output from the correction image generation unit 105. The correction image generation unit 105 may make the correction images bright in a case where the visual fields of the user are dark. Consequently, the user can see a subject clearly even when the surroundings are dark.

Each constituent element forming the image generation section 100 of FIG. 1 may be realized by hardware such as an electronic circuit or an integrated circuit, and may be realized by software such as a program executed in a computer.

FIG. 3 is a diagram illustrating a hardware configuration of the image display device 1 including a computer in Embodiment 1. In FIG. 3, the visual field imaging units 111 capture and output visual field images, the eye imaging units 112 capture and output eye images, and a computer 300 acquires the visual field images and the eye images, and generates, calculates and outputs correction images and control information. A display 120 displays the correction images generated by the computer 300. Cameras are used in the visual field imaging units 111 and the eye imaging units 112.

The computer 300 includes a CPU 301, a ROM 302, a RAM 303, an HDD 304, a video input interface (I/F) 305, a video card 306, and an interface (I/F) 307. A program for operating the computer 300 is held in advance in the ROM 302 or the HDD 304. The program is read from the ROM 302 or the HDD 304 to the RAM 303 so as to be developed by the CPU 301 which is a processor. The CPU 301 executes coded commands of the program developed on the RAM 303. The video input I/F 305 stores images captured by the imaging section 110 in the RAM 303 according to the execution of the program. The video card 306 outputs the generated images according to the execution of the program, and the display section 120 displays the images. The CPU 301 controls the projection optical system 122 via the I/F 307 according to the execution of the program.

In addition, the computer program may be stored in not only the ROM 302 which is a semiconductor or the HDD 304 but also in a CD-ROM, for example. Further, the computer program may be transmitted via a wired or wireless network, broadcast, or the like, and may be stored in the RAM 303 of the computer 300.

Hereinafter, with reference to FIG. 4, a description will be made of an operation of the image display device 1 in Embodiment 1.

FIG. 4 is a flowchart illustrating an operation of the image generation section 100 of the image display device in the present embodiment. In FIG. 4, seven steps S400 to S406 are executed by the computer 300 of FIG. 3.

In addition, the respective steps of FIG. 4 may be executed by the five processing units forming the image generation section 100 of FIG. 1. In other words, each operation is performed as follows: the visual field imaging units 111 executes a visual field imaging step S400; the distance calculation unit 101 executes a distance calculation step S401; the eye position calculation unit 102 executes an eye position calculation step S402; the eyesight information acquisition unit 103 executes an eyesight information acquisition step S403; the naked-eye image generation unit 104 executes a naked-eye image generation step S404; the correction image generation unit 105 executes a correction image generation step S405; and the display section 120 executes a display step S406.

In the imaging section 110, the two visual field imaging units 111 output moving images obtained by capturing images of regions which respectively include the left and right visual fields of the user, as visual field images (step S400). The two eye imaging units 112 output moving images obtained by capturing images of regions which respectively include the left and right eyes 200 of the user. In Embodiment 1, it is assumed that the moving images output from two (a total of four) imaging units of each of the visual field imaging units 111 and the eye imaging units 112 are formed of images which are captured at certain intervals in a synchronous manner. In addition, the moving image output from each imaging unit (the visual field imaging units 111 and the eye imaging units 112) indicates an image of one frame forming an image and a moving image unless otherwise mentioned, when the images are constituted by height 1080 pixels×width 1920 pixels×60 frames/second. Further, a plurality of images simultaneously treated in each processing unit are assumed to be simultaneously captured.

In Embodiment 1, as an example, a description will be made of a case where the user is presbyopic, and presbyopia is corrected by the image display device 1. FIG. 5($a$) is a diagram illustrating an example of use circumstances in Embodiment 1. FIG. 5($a$) illustrates an example in which a user wearing the spectacle-like image display device 1 is reading a book while sitting on a chair. It is assumed that a distance between the book and the eyes of the user is about 0.5 m, and the user is presbyopic and thus cannot clearly see an object at the distance of 0.5 m with the naked eyes.

FIG. 5($b$) illustrates visual fields of the left and right eyes of the user. A left figure illustrates a visual field of the left eye, and a right figure illustrates a visual field of the right eye. These diagrams illustrate that a wide range including the book and a desk is included in the visual field of the user. FIG. 5($c$) illustrates examples of visual field images which are respectively captured by the left and right two visual field imaging units 111. A left figure illustrates a left visual field image captured by the visual field imaging unit 111$a$, and a right figure illustrates a right visual field image captured by the visual field imaging unit 111$b$. The visual field images include the visual fields captured via the half mirrors 123 and are thus actually mirror images of the images illustrated in FIG. 5($b$), but, here, for simplification of description, the visual field images are illustrated as normal images in which left and right sides are reversed. Hereinafter, unless otherwise mentioned, an image which is generated as a mirror image due to an influence of the half mirrors 123 is illustrated assuming that the image is converted into a normal image. Each of the visual field images of FIG. 5($c$) has a range narrower than each of the images of the visual fields of FIG. 5($b$). This indicates that an image of a part of the central portion of the visual field range of the user illustrated in FIG. 5($b$) is captured as the visual field image.

Along with the operation in which the imaging section 110 captures and outputs the images, the computer 300 performs the operations in steps S400 to S406 of FIG. 4 by executing a predefined program.

Then, specific operations in steps S400 to S406 executed in the computer 300 will be described with reference to FIGS. 4 to 10.

In the visual field imaging step S400, the visual field imaging units 111 of the imaging section 110 capture and output visual field images which are images of the visual fields of the user.

In the distance calculation step S401, the left and right two visual field images are received, and three-dimensional positions of a subject are calculated by using a binocular stereoscopic method, so as to be output as distance images. In other words, left and right two visual field images Iel and Ier output from the visual field imaging units 111 are received, and three-dimensional positions of the subject in the visual field images are calculated by using the binocular stereoscopic method so as to be output as two distance images Dl and Dr which respectively correspond to the left and right two visual field images (refer to FIG. 6).

Specifically, pixel coordinates (urn,vrn) of corresponding points on the right visual field image are detected with pixel coordinates (uln,vln) of N pixels pln of the left visual field image as references. In addition, three-dimensional positions (xln,yln,zln), corresponding to the pixels pln, with a focal point of the left visual field imaging unit 111a as a coordinate origin, are calculated by using three-dimensional positions of the two visual field imaging units and internal parameters of the visual field imaging unit 111a (camera), obtained in advance. In the same manner for the right visual field image, three-dimensional positions (xrm,yrm,zrm), corresponding to M pixels prm, with a focal point of the right visual field imaging unit 111b as a coordinate origin, are calculated. Further, distances to the three-dimensional positions corresponding to the calculated pixel coordinate values (u,v) of the respective visual field images are output as distance images D={d(u,v)}.

A corresponding point search method of calculating corresponding pixels between the two images or a motion estimation method is disclosed in detail in NPL 1, NPL 2, or the like, and thus detailed description thereof will be omitted here. Similarly, a binocular stereoscopic method of calculating three-dimensional positions on the basis of corresponding points between the two images and the two camera positions is disclosed in detail in NPL 3 or the like, and thus detailed description thereof will be omitted here.

(NPL 1) Vladimir Kolmogorov and Ramin Zabih, "Computing Visual Correspondence with Occlusions via Graph Cuts", International Conference on Computer Vision, 2001

(NPL 2) P. Anandan, "A Computational Framework and an Algorithm for the Measurement of Visual Motion", International Journal of Computer Vision, Vol. 2, pp. 283 to 310, 1989

(NPL 3) Takashi MATSUYAMA et al., "Computer Vision", ShinGijutsu Communications K.K. pp 123 to 137.

FIG. 6 is a schematic diagram illustrating an example of distance images corresponding to visual field images. A left image is a distance image Dl corresponding to the left visual field image, and a right image is a distance image Dr corresponding to the right visual field image. In this example, distances d(uln,vln) from the left visual field imaging unit are calculated by using (Equation 1) on the basis of the three-dimensional positions (xln,yln,zln) corresponding to the pixel coordinates (uln,vln) of the pixels pln, and, in the images, the longer the distance is, the greater the luminance value is.

$$d(u_{ln}, v_{ln}) = \sqrt{x_{ln}^2 + y_{ln}^2 + z_{ln}^2}$$ (Equation 1)

For example, in FIG. 6, as the distances from the visual field imaging units 111 to the subjects, a distance to the book is 0.5 [m], and a distance to the table is 0.8 [m].

In FIG. 6, for description, information regarding the three-dimensional position is illustrated as the distance image, but a data form indicating information regarding the three-dimensional position is not limited to the distance image, and any data form may be used as long as the data form can indicate information regarding the three-dimensional position.

Next, in the eye position calculation step S402, left and right two eye images captured by the two eye imaging units 112 are received, and positions and postures of the eyes of the user are estimated from the respective eye images so as to be output as eye position information.

Specifically, in the eye position calculation step S402, an iris position is estimated by using an edge characteristic in the image on the basis of each of the left and right eye images, and an elliptical model is applied at the estimated iris position so as to allow an elliptical parameter to be calculated. In addition, on the basis of a relationship between each of the left and right eyes 200 and the elliptical parameter of the iris when gazing at a point in the real space corresponding to a certain point (u,v) of the visual field image, obtained in advance, pixel coordinate values (ue,ve) of the gaze point in the visual field image are obtained from the elliptical parameter which is calculated from the eye image, and these values are output as the eye position information.

The above-described method of estimating a gaze point on the visual field image from the eye image including the iris is described in NPL 4 or the like in detail, and thus detailed description thereof will be omitted here.

(NPL 4) Takeo Kanade, and, Martial Hebert, "First-Person Vision", Proceedings of THE IEEE, Vol. 100, No. 8, pp. 2442 to 2453, August 2012

FIG. 7 illustrates examples of eye images and eye position information, more specifically, examples of eye images, estimated iris positions (eye position information), and gaze point positions in visual field images. FIG. 7(a) schematically illustrates examples of left and right eye images, in which a left figure illustrates an eye image of the left eye, and a right figure illustrates an eye image of the right eye. FIG. 7(b) schematically illustrates an example of a result of iris positions being estimated on the basis of edge characteristics extracted from the eye images, and elliptical models (solid thick lines) being applied to the estimated iris positions. FIG. 7(c) schematically illustrates a result of estimating gaze point positions on the visual field images, and illustrates gaze point positions obtained on the basis of a correspondence relationship between the parameters of the elliptical models of the irises obtained in advance and gaze point positions of the user, and the iris positions estimated from the eye images. This example illustrates that the user gazes at books located at pixel coordinates (ule,vle) and (ure,vre) of the left and right visual field images.

Next, in the eyesight information acquisition step S403, eyesight information which is information regarding eyesight of the user is stored in advance, and the information is read and is output. In addition, the eyesight information may be acquired via a communication line or the like as necessary, instead of being stored in advance.

In Embodiment 1, the eyesight information of the user is expressed by a set of a parameter σ of a point spread function indicating blurring, corresponding to a distance d to a subject, and a diopter s of a lens for clearly seeing the subject at the distance d. Generally, the shortest distance at which clear vision is possible is called a near point. The presbyopia is a symptom in which the adjustment function of the eyes is weakened by aging so that the near point becomes distant, and thus a near object appears blurred. In a case where a presbyopic person sees a subject nearer than the near point, an imaging position is located further backward than the retina, as a result, an image is not formed on the retina, and thus the subject appears blurred. In this case, as the distance d [m] between the eye and the subject is reduced, the imaging position is located much further backward than the retina, and thus an extent of blurring increases. The blurring which occurs due to deviation of the imaging position relative to the projection surface can be indicated by a point spread function (PSF). Therefore, in Embodiment 1, information regarding the eyesight of the user is expressed by a relationship between a distance d [m] to a subject and a PSF indicating an extent of blurring with a visual field image as a reference.

In Embodiment 1, a PSF for blurring is expressed by a two-dimensional normal distribution function of (Equation 2).

$$h(du, dv) = \frac{1}{2\pi\delta^2}\exp\left(-\frac{du^2 + dv^2}{2\delta^2}\right) \quad \text{(Equation 2)}$$

(Equation 2) indicates a function of a two-dimensional normal distribution of an average (0,0) and variance $\sigma^2$. (du,dv) indicates two-dimensional coordinates on an image, and $\delta$ indicates a spread extent of blurring. As $\delta$ increases, an extent of blurring becomes higher.

In addition, a PSF for blurring due to deviation of the imaging position is expressed by (Equation 2) but is not limited thereto, and any PSF may be used as long as the PSF approximates blurring of the eyes of the user. For example, a PSF of (Expression 3) indicating a circular opening whose intensity is uniform may be used.

$$h_c(du, dv) = \begin{cases} \frac{1}{2\pi R^2} & \text{if } du^2 + dv^2 \leq R^2 \\ 0 & \text{else} \end{cases} \quad \text{(Equation 3)}$$

In (Expression 3), (u,v) indicates two-dimensional coordinates on an image, and R indicates a spread diameter of blurring. Whereas a parameter indicating an extent of blurring is $\sigma$ in the PSF of (Equation 2), a parameter indicating an extent of blurring is R in the PSF of (Expression 3). As R increases, an extent of blurring becomes higher.

FIG. 8 illustrates an example of eyesight information in a case where the user is presbyopic. In Embodiment 1, for simplification of description, it is assumed that the user has the same eyesight in the left and right eyes. FIG. 8 illustrates a relationship between a distance d [m] from the eye of the user, $\sigma$ [pixel] of (Equation 2), and a diopter s [D] of a correction lens for clear vision of a subject at the distanced. For example, in a case where the user sees a subject at d=0.5 [m], that is, at a distance of 0.5 m, an image which is projected onto the eye of the user has blurring which is equivalent to that of a visual field image which undergoes a convolution process at $\sigma$=2 [pixel] by using (Equation 2). In a case where a distance is longer than 0.7 [m], $\sigma$ is 0, which indicates blurring does not occur (the PSF shows a delta response). In addition, an SPH indicates a diopter of a spherical lens, and is a reciprocal of a value which indicates a focal length in the unit of meters. When the user sees a subject at a distance of 0.5 m, the user can clearly see the subject through a lens with a diopter of 2.0, that is, with a focal length of 0.5 [m].

The relationship between the distance d from the eye of the user and $\sigma$ indicating an extent of blurring of a visual field image, illustrated in FIG. 8, is acquired in advance through a subjective evaluation test of the user. For example, the user wears the image display device 1 (FIG. 2) of the present embodiment, observes a subject such as the book including letters with different sizes illustrated in FIG. 5, at a predetermined distance di, and simultaneously the visual field imaging units 111 acquire visual field images. In addition, a plurality of images are generated by adding blurring of (Equation 2) to the visual field images while changing $\sigma$ from 1 to 10, and $\sigma i$ of a blurring image which is most similar to blurring seen with the eyes is determined as $\sigma i$ corresponding to the distance di. The above-described process is performed in a range of distances d at where blurring occurs, for multiple times (in the example of FIG. 8, five times at distances of 0.3, 0.4, 0.5, 0.6, and 0.7), and thus it is possible to obtain eyesight information.

In addition, in Embodiment 1, a description has been made of a case where eyesight information is acquired in advance through subjective evaluation, but a method of obtaining eyesight information is not limited thereto, and other methods may be used. For example, a plurality of pairs of presbyopia spectacles with different degrees are prepared, and a convex lens which enables a subject located at a certain distance d to be seen clearly and has the lowest degree is selected. In addition, an extent of blurring in the eyes of the user and an extent $\sigma$ of blurring in visual field images are obtained from the degree (a reciprocal of the focal length) of the convex lens at this time. This process is repeatedly performed at a plurality of distances d, and thus the eyesight information of FIG. 8 can be obtained.

Next, in the naked-eye image generation step S404, gaze point positions of the user are estimated on the basis of the positions of the eyes of the user or the postures of the eyes and the distance images, and naked-eye images which are images projected onto the retinae when the user directly sees the gaze points are generated and output on the basis of the estimated gaze point positions, the eyesight information of the user, and the visual field images. In other words, distances del and der to the gaze points are obtained on the basis of the gaze points (ule,vle) and (ure,vre) of the user and the distance images Dl and Dr. In addition, naked-eye images Inl and Inr which are images to which an influence of blurring occurring when the user directly observes the visual field images Iel and Ier is added are generated and output on the basis of the parameter of the PSF included in the eyesight information of the user, corresponding to the gaze point distances del and der.

A method of generating naked-eye images In from the visual field images Ie and (Equation 2) or (Expression 3) is expressed by (Equation 4).

$$i_n(u, v) = \sum_{du, dv} h(du, dv) i_e(u, v) \quad \text{(Equation 4)}$$

An example of the naked-eye image generation step S404 will be described with reference to FIGS. 6 to 9. FIG. 7(c) illustrates that gaze points of the user correspond to the coordinates (ule,vle) and (ure,vre) on the book. In addition, FIG. 6 illustrates that distances to the book including the gaze points are 0.5 [m]. As a result, in the naked-eye image generation step S404, the distances d to the gaze points on the book (subject) are estimated as 0.5 [m] in both of the left and right eyes on the basis of the distance images corresponding to the gaze point coordinates. In addition, the parameter σ=2 [pixel] of the PSF at a distance of d=0.5 [m] is obtained from the eyesight information of the user illustrated in FIG. 8. Further, a convolution calculation is performed on pixels having the same distance as the distance of d=0.5 [m] of the gaze points in the visual field images of FIG. 7(c) by using the PSF of (Equation 4), so as to generate naked-eye images which are images obtained by applying the PSF equivalent to the eyesight of the user to the visual field images.

FIG. 9 illustrates examples of a visual field image and a naked-eye image generated in the naked-eye image generation step S404. FIG. 9(a) illustrates a left visual field image captured by the visual field imaging unit 111a, and FIG. 9(b) illustrates a left naked-eye image generated by performing convolution on pixels (pixels forming a distance image of 0.5 [m]) of which a distance is 0.5 [m] in a distance image corresponding to respective pixels of the visual field image, by using the PSF (Equation 2) at σ=2. The naked-eye image is obtained by adding blurring equivalent to the blurring of the user due to the presbyopia to the distance image of the book located at the distance of 0.5 [m] at which the user gazes.

Finally, in the correction image generation step S405, a correction image is calculated on the basis of a difference image between the naked-eye image and the distance image. In addition, a signal for controlling the projection optical system 122 is output so that an image on the display section is seen clearly at the gaze point position on the basis of the eyesight information of the user. Further, a distortion by the projection optical system is calculated, and transform for compensating for the distortion is applied to the correction image which is then output. In other words, correction images Icl and Icr are generated on the basis of differences between the naked-eye images Inl and Inr and the visual field images Iel and Ier. In addition, a control signal is output to the projection optical system 122 so that the user can clearly see the correction images displayed on the image display units 121 at the same positions and sizes as those of the gaze points, on the basis of the eyesight information of the user.

In the correction image generation step S405, the difference image Id={id(u,v)} is calculated from the visual field image Ie=(ie{u,v}) and the naked-eye image In={in(u,v)} by using (Equation 5).

$$i_d(u,v) = i_e(u,v) - i_n(u,v) + C_{off} \quad \text{(Equation 5)}$$

In (Equation 5), Coff is a constant which is added so that the difference image does not become a negative value, and is assumed to be predefined.

In addition, in the correction image generation step S405, the correction image Ic={ic(u,v)} is generated by using the difference image Id and geometric transform F which is obtained in advance according to (Equation 6).

$$i_c(u,v) = i_d(u',v')$$

$$(u',v') = F(d,s,u,v) \quad \text{(Equation 6)}$$

In (Equation 6), F(d,s,u,v) is a two-dimensional geometric transform function for transforming pixel coordinates (u,v) into (u',v'), and corresponds to inverse transform of an image distortion in the projection optical system. In addition, d indicates a distance to the gaze point, and s indicates the diopter s included in the eyesight information of the user, corresponding to the distance d. The user observes the correction images displayed on the image display units 121 via the projection optical system 122. At this time, deformation such as a distortion occurs in the images on the image display units 121 in relation to positions and sizes. Therefore, the two-dimensional geometric transform F which is inverse transform of a distortion by the projection optical system 122 is obtained in advance, and the geometric transform F is applied to the difference image according to (Equation 6) so as to generate the correction image.

In addition, in the correction image generation step S405, the correction images displayed on the image display units 121 are displayed at the optically same distance as the gaze point distance d=0.5 [m] via the projection optical systems 122, and the projection optical systems 122 are controlled so that the user can see the subject clearly through a convex lens with the diopter s=2.0 (a focal length of 0.5 m). Herein, the diopter s=2.0 [D] is output at the gaze point distance d=0.5 [m].

FIG. 10 illustrates examples of the difference image calculated and the correction image generated in the correction image generation step S405. When a visual field image is the image illustrated in FIG. 9(a), a naked-eye image is the image illustrated in FIG. 9(b), a difference image of a difference obtained by subtracting the naked-eye image from the visual field image is illustrated in FIG. 10(a). Since a negative luminance value cannot be treated in an image, the offset value Coff is added so that the difference between the visual field image and the naked-eye image does not become a negative value. In the example of FIG. 10(a), Ci is set to 128. Further, FIG. 10(b) illustrates an example of a correction image into which the difference image is geometrically transformed according to (Equation 6).

As mentioned above, the computer 300 generates and outputs the correction images by using the visual field images, the distance information, and the eyesight information through the operations in steps S400 to S405.

Next, in the display step S406, the display section 120 displays the correction images Icl and Icr output from the image generation section 100 on the left and right two image display units 121a and 121b. In addition, the projection optical system 122 is controlled so that the correction images Icl and Icr displayed on the image display units are seen at the distance d from the user, and the user can see the correction images clearly.

In Embodiment 1, the projection optical system 122 enlarges and displays the image display units 121 by M times in the same principle as that of a magnifier when the image display units 121 are viewed through the convex lenses, so that the image display units 121 look like being located at the distance d from the eyes 200. Further, in order to change the magnification M according to the distance d, a configuration is used in which positions of the convex lenses and the eyes 200 are variable. Still further, a configuration is used in which a lens with a focal length 1/s corresponding to the diopter s is added so that the user can see the image display units 121 clearly. Since the focal length 1/s is changed according to the diopter s, a configuration is used in which a gap between the two lenses is variable. A method of changing an arrangement of the lenses, the magnification M, and a focal length f is disclosed in NPL 5, and detailed description will be omitted here.

(NPL 5) Shinichi NAGATA, "Visual Engineering", ISBN4-534-03491-1, Nippon Jitsugyo Publishings, pp. 98 to 99, and pp. 120 to 129

FIG. 11 illustrates examples of images on the display section 120, observed by the user. Each of the image display units 121 displays the correction image of FIG. 10(b), and FIG. 11(a) illustrates an image in a case where the observers views only the correction image through the projection optical system 122. The image illustrated in FIG. 11(a) is the same as the difference image illustrated in FIG. 10(a). The correction image (FIG. 10(b)) obtained by applying the inverse transform of the deformation in the projection optical system to the difference image is deformed when observed through the projection optical system, and thus the same image as the original correction image is viewed. In addition, the user observes the correction image of FIG. 11(a) displayed on each of the image display units 121 and an image (which is the same as the illustrated in FIG. 9(b)) in an overlapping manner through the half mirrors 123. FIG. 11(b) illustrates an example of a combined image in this case. The correction image of FIG. 11(a) corresponds to blurring due to the presbyopia, that is, a difference between the visual field image and the naked-eye image, and overlapping the correction image on the subject image corresponds to inverse transform of the blurring due to the presbyopia. For this reason, it is possible to observe the image without blurring as illustrated in FIG. 11(b).

In other words, in a case where the image display device 1 of Embodiment 1 is not used, the user cannot see the book clearly due to the blurring caused by the presbyopia as illustrated in FIG. 9(b) when directly viewing the book at the gaze point distance d=0.5 [m]. In contrast, in a case where the image display device 1 of Embodiment 1 is used, it is possible to see the book at the gaze point distance d=0.5 [m] clearly.

As mentioned above, as a result of the operations of the imaging section 110, the image generation section 100, and the display section 120, the user can clearly see the book located at the distance d=0.5 [m].

Also in a case where the user gazes at a different subject, the image display device 1 of Embodiment 1 repeatedly performs the same operation. In other words, by using the parameter σ of the PSF and the diopter s, corresponding to a distance d to a gaze point, it is possible to clearly see a subject at the gaze point even in a case where the distance d changes. In addition, in a case of the distance d>0.7 [m], since blurring associated with a PSF does not occur, a naked-eye image becomes the same as a visual field image, and thus a difference image and a correction image are displayed only in a specific color Coff. At this time, the user can clearly see a subject at d>0.7 [m], and also can thus clearly see a far subject.

As described above, as a result of the operations of the imaging section 110, the image generation section 100 realized by the computer 300, and the display section 120 of the image display device 1 of Embodiment 1, the user views a correction image (FIG. 11(a)) in an overlapping manner in addition to an image (FIG. 9(b)) which enters to the eyes of the user from a subject, and can thus see the subject clearly (FIG. 11(b)). As a result, both a near object and a far object can be seen clearly. In addition, in the image display device 1 of Embodiment 1, since there is no lens between the user and the subject, it is possible to achieve an effect particular to the present invention, in which an image of the subject is not spatially distorted or a distortion does not change over time.

In addition, in Embodiment 1, the projection optical system 122 has a configuration of changing a distance between a plurality of lenses, and enlarges the image display units 121 in proportion to the distance d and enables the image display units to be seen clearly, by controlling positions of the lenses in accordance with inputting of the distance d of a gaze point and the diopter s. However, a configuration of the projection optical system 122 is not limited thereto and may have other configurations. For example, a concave mirror or a convex mirror may be used instead of the lens. Further, instead of changing positions of the lenses in order to change a magnification or a focal length, there may be the use of a lens which can change a refractive index by using liquid crystal, a lens which can change a refractive index by changing a thickness of the lens through injection and discharge of a liquid into and out of the lens. If the lens with a variable refractive index is used, there is an effect in which, since positions of lenses may not be changed, or a width of a position change can be reduced, the volume of the projection optical system 122 can be reduced, or since the number of movable mechanisms is small, durability increases.

In addition, in Embodiment 1, the display section 120 is configured to include the image display units 121 and the projection optical system 122, and the projection optical system 122 has the lens with a focal length 1/s corresponding to the diopter s so that the user can see the image display units 121 clearly. However, a configuration of the display section 120 is not limited thereto, and may have any configuration as long as the configuration enables a user with ametropia of the eyes to have clear vision.

For example, instead of providing the lens for clearly viewing the image display units 121 in the projection optical system 122, a retinal scanning type display device may be used as the display section 120. The retina scanning type display device is disclosed in PTL 5 or the like, and thus detailed description thereof will be omitted here.

(PTL 5) Japanese Patent No. 4057533

If the retina scanning type display device forms a Maxwell view optical system, even a user with ametropia of the eyes such as presbyopia or myopia can see an image clearly without using a lens corresponding to the eyesight of the user. For this reason, if the retina scanning type display device is used in the display section 120, there is another effect in which an optical system or an adjustment mechanism adopted to meet a user with different eyesight, and a control mechanism or a process of an optical system for performing clear vision in accordance with a distance to a subject, are not necessary.

In addition, in Embodiment 1, the description has been made assuming that the left and right visual field imaging units 111a and 111b are disposed respectively at the optically same positions as those of the left and right eyes of the user, but positions of the visual field imaging units 111 may not necessarily match positions of the eyes 200 of the user.

For example, even in a case where the visual field imaging units 111 are disposed to be deviated relative to positions of the eyes 200 of the user, the naked-eye image generation unit 104 generates a naked-eye image in which the positional deviation has been compensated, and thus it is possible to achieve an effect equivalent to that in Embodiment 1. A description will be made of a method of generating a naked-eye image in which a positional deviation has been compensated in a case where there is the positional deviation between the visual field imaging units 111 and the eyes 200 of the user.

A three-dimensional positional deviation between the eyes 200 of the user and the visual field imaging units 111 is measured in advance. Next, compensated visual field images which are images obtained when the visual field imaging units 111 are virtually moved to the positions of the eyes 200 of the user are generated by using a computer graphics technique on the basis of the three-dimensional positional deviation measured in advance, visual field images captured by the visual field imaging units 111, and distance images calculated by the distance calculation unit 101. A method of generating an image of which a viewpoint is changed from an image and a distance image corresponding to the image are a well-known method as a fundamental technique of computer graphics, and thus detailed description thereof will be omitted here. Finally, the naked-eye image generation unit 104 generates naked-eye images from the generated compensated visual field images through the same operation as that in Embodiment 1. In addition, other processing units perform the same operations as those in Embodiment 1, and thus it is possible to achieve an effect equivalent to that in Embodiment 1.

As another example in which positions of the visual field imaging units 111 are deviated relative to positions of the eyes of the user, even if the visual field imaging units 111 are located at the same positions as the positions of the eyes 200 of the user when the user faces the front, when the user gazes away from the front, the eyeballs are rotated, thus pupil positions are separated from the optical axes of the visual field imaging units 111, and, as a result, the positions of the visual field imaging units 111 are deviated relative to the positions of the eyes 200 of the user. Even in this case, a relationship of a three-dimensional positional deviation between gaze point positions of the user, positions of the eyes 200 of the user, and positions of the visual field imaging units 111, is measured in advance, and thus it is possible to generate compensated visual field images in which the deviation has been compensated through the method as described above. As a result, even in a case where the user gazes away from the front, it is possible to achieve an effect equivalent to that in Embodiment 1.

As another method of obtaining visual field images which match positions of the eyes 200 of the user in a case where positions of the visual field imaging units 111 are deviated relative to the positions of the eyes 200 of the user, a light field camera may be used in the visual field imaging units 111 instead of using a typical camera. The light field camera can simultaneously capture multi-viewpoint images by using a multi-imaging optical system, and thus it is possible to generate an image in which a viewpoint has been moved or an image in which a focal position has been changed, from the obtained multi-viewpoint images. For this reason, if the light field camera is used in the visual field imaging units 111, even in a case where the visual field imaging units 111 are provided at locations deviated relative to the positions of the eyes 200 of the user or in a case where the user gazes away from the front, it is possible to generate compensated visual field images which are captured from the positions of the eyes 200 of the user and thus to obtain an effect equivalent to that in Embodiment 1.

Embodiment 2

In the above-described Embodiment 1 of the present invention, the image display device 1 is configured to include the imaging section 110 and the display section 120 for both of the left and right eyes. In contrast, in Embodiment 2, a description will be made of an display device 2 having a configuration in which the visual field imaging unit 111, the eye imaging unit 112, the image display unit 121, and the projection optical system 122 for either one of the left and right eyes are excluded.

FIG. 12 is a block diagram illustrating a configuration of the image display device 2 of Embodiment 2; FIG. 13 is a schematic diagram illustrating an arrangement of an optical system of the image display device 2 of Embodiment 2; and FIG. 14 is a flowchart illustrating an operation procedure of an image generation section.

The distance calculation unit 101 (a portion performing the distance calculation step S401) of Embodiment 1 receives two visual field images captured by the left and right visual field imaging units 111, and calculates distance images by estimating three-dimensional positions by using the bifocal stereoscopic method (refer to FIGS. 1 to 3). In contrast, in Embodiment 2, the visual field imaging unit 111 captures a plurality of images (multi-focal images) in which a focus is changed, and a distance image calculation unit 101' (distance image calculation step S401') calculates a distance image from the multi-focal images by using a distance estimation method.

Hereinafter, with reference to FIGS. 12 to 14, a description will be made of an operation of the image display device 2 of Embodiment 2.

A difference between the operation of the image display device 2 of Embodiment 2 and the operation in Embodiment 1 is only an operation in a distance calculation step S401' (or the distance calculation unit 101') (refer to FIGS. 12 and 14). Other processing steps are the same as those in Embodiment 1, and other processing units perform the same operations as those in Embodiment 1.

As illustrated in FIG. 13, the image display device 2 includes a visual field imaging unit 111, an eye imaging unit 112, an image display unit 121, and a projection display system control unit 122, and is mounted on one of the eyes 200. For this reason, in the imaging section 110 of FIG. 12, the visual field imaging unit 111 repeatedly captures a plurality of visual field images (multi-focal visual field images) which are captured while changing a focus and outputs the images, and the eye imaging unit 112 captures and outputs eye images.

In Embodiment 2, each constituent element forming the image generation section 100 is realized by software such as a program executed in a computer.

In the distance image calculation step S401', distance images are calculated from multi-focal images by using a distance estimation method. In addition, focused images are treated as the visual field images in Embodiment 1 on the basis of a plurality of multi-focal images. In other words, visual field images of the multi-focal images are received, and three-dimensional positions of a subject are calculated from the multi-focal images by using a distance estimation method and are output as distance images. The distance estimation method from the multi-focal images is disclosed in NPL 7 or the like, and thus detailed description thereof will be omitted here.

(NPL 7) Naoki ASADA, Hisanaga FUJIWARA, and Takashi MATSUYAMA, "Edge and Depth from Focus", The Journal of the Institute of Electronics, Information and Communication Engineer, D-II, Vol. J77-DII, No. 6, pp 1048 to 1058, June, 1994

The same operations as those in Embodiment 1 are performed in the visual field imaging step S400, the eye position calculation step S402, the eyesight information acquisition step S403, the naked-eye image generation step S404, the correction image generation step S405, and the display step S406, illustrated in FIG. 14.

In the display section 120, in the same manner as in Embodiment 1, the image display unit 121 displays a correction image, and the projection optical system 122 matches a distance d and a diopter s with each other, so that the user can see the correction image clearly.

Through the above-described operations in Embodiment 2, in the same manner as in Embodiment 1, the user views a correction image (FIG. 11(a)) in an overlapping manner in addition to an image (FIG. 9(b)) which enters to the eyes of the user from a subject, and can thus see the subject clearly (FIG. 11(b)). As a result, both a near object and a far object can be seen clearly. In addition, in the image display device 2 of Embodiment 2, there is no lens between the user and the subject, it is possible to achieve an effect particular to the present invention, in which an image of the subject is not spatially distorted or a distortion does not change over time.

If a method of estimating a distance from multi-focal images is used as a method of calculating a distance image, it is possible to generate a distance image from images captured by a pair of visual field imaging units 111. As a result, even if a single visual field imaging unit 111 is provided, the same operation as that in Embodiment 1 can be performed, and, as a result, it is possible to achieve the same effect as that in Embodiment 1.

As mentioned above, in the same manner as in the image display device of Embodiment 1, in Embodiment 2, the user sees an object without using a lens, and can thus see the object without distortion. In addition, regarding a near object which cannot be seen clearly without using spectacles due to presbyopia, the near object is observed in a state of overlapping a correction image and can thus be seen clearly. Further, a far object can also be seen clearly without distortion.

Still further, in the image display device 2 of Embodiment 2, when compared with the image display device 1 of Embodiment 1, the number of the visual field imaging units 111, the eye imaging units 112, the image display units 121, and the projection optical systems 122 is reduced by half, and thus there is an effect in which the device can be manufactured in a small size and at low cost.

Embodiment 3

In the above-described Embodiments 1 and 2, assuming that a gaze point of the user changes, the image generation section 100 estimates the gaze point of the user, generates a correction image on the basis of the estimated value, and controls a distance of the projection optical system.

On the other hand, as a method of using presbyopia spectacles in the related art, generally, assuming that a distance to a book when a certain user is reading the book or a distance to a display when the user performs work with a PC is constant, spectacles with a degree which matches the distance are used. Therefore, in Embodiment 3, a description will be made of a configuration of an image display device in a case where a distance for correcting presbyopia is assumed to be constant.

In Embodiments 1 and 2, the image display devices 1 and 2 include the eye imaging unit 112 and the eye position calculation unit 102, whereas, in an image display device 3 of Embodiment 3, the eye imaging unit 112 and the eye position calculation unit 102 are omitted. In addition, the projection optical system 122 has a configuration in which a control signal is not output from the image generation section 100 since a distance d and a diopter s for displaying the image display unit 121 are constant.

Hereinafter, with reference to FIGS. 15 to 17, a description will be made of an operation of the image display device 3 of Embodiment 3. In description of the operation in Embodiment 3, it is assumed that a gaze point is a central part (ulc,vlc) of a visual field, and a distance to a subject is constant as d0=0.5 [m].

In the imaging section 110, the visual field imaging unit 111 captures and outputs a plurality of visual field images (multi-focal visual field images) which are captured while changing a focus.

In Embodiment 3, each constituent element forming the image generation section 100 is realized by software such as a program executed in a computer.

FIG. 17 is a flowchart illustrating an operation procedure of the image generation section in Embodiment 3. As illustrated in FIG. 17, in an eye position calculation step S402', eye positions are calculated on the basis of the assumption that the user sees the gaze point at a predefined distance. In other words, there is a difference from the eye position calculation step S402 in Embodiment 2 in that a distance to the gaze point is constant as d=d0. Except for the eye position calculation step S402', the same operations as those in Embodiment 2 are performed in the visual field imaging step S400, the distance calculation step S401', the eyesight information acquisition step S403, the naked-eye image generation step S404, the correction image generation step S405, and the display step S406.

In the same manner as in Embodiment 2, in the display section 120, the image display unit 121 displays a correction image, and the projection optical system 122 enables the user to see the correction image clearly in an arrangement which satisfies the distance d=d0 and a diopter s0 of the eyesight information of the user, corresponding to d0.

Through the above-described operations in Embodiment 3, in the same manner as in Embodiments 1 and 2, the user views a correction image (FIG. 11(a)) in an overlapping manner in addition to an image (FIG. 9(b)) which enters to the eyes of the user from a subject, and can thus clearly see the subject at the distance d0 (FIG. 11(b)). As a result, both a near object located at d0 and a far object can be seen clearly. On the other hand, in a case where a subject located near at distances d other than d0 is seen, blurring in the subject cannot be corrected. However, in the same manner as in the method of using spectacles in the related art, for example, in a case where it can be expected that a subject is not present at places located at distances other than the constant distance d0 in reading, work using a PC, or the like, there is no problem in practical use.

In addition, in the image display device 3 of Embodiment 3, there is no lens between the user and the subject, it is possible to achieve an effect particular to the present invention, in which an image of the subject is not spatially distorted or a distortion does not change over time.

As mentioned above, in the same manner as in the image display devices 1 and 2 of Embodiments 1 and 2, in the image display device 3 of Embodiment 3, the user sees an object without using a lens, and can thus see the object without distortion. In addition, regarding a near object which cannot be seen clearly without using spectacles due to presbyopia, the near object is observed in a state of overlapping a correction image and can thus be seen clearly. Further, a far object can also be seen clearly without distortion.

Still further, in Embodiment 3, when compared with Embodiment 2, the eye imaging unit 112 and the eye position calculation unit 102 are not necessary, and the projection optical system 122 may be fixed. Therefore, there is an effect in which the device can be manufactured in a small size and at low cost.

Embodiment 4

In Embodiments 1 to 3 of the present invention, as illustrated in FIG. 8, the eyesight information of the user is expressed by a set of a parameter σ of a point spread function indicating blurring, corresponding to a distance d to a subject, and a diopter s of a lens for clearly seeing the subject at the distance d. However, the present invention is not limited thereto, and other conditions may be added.

There is a case where performance of the eyes to adjust a focal point for seeing a subject clearly may not be constant but change over time. For example, there is a case where, even if letters are seen to be blurred immediately after starting to read a book, the letters becomes clearly seen when some time passes. In order to handle the change in the eyesight of the user over time, instead of the eyesight information of the user, used in Embodiments 1 to 3, which is constant regardless of the passage of time, eyesight information which changes over time may be used.

In Embodiment 4, there is the use of eyesight information including information regarding a change in the eyesight of the user over time. An operation of each processing unit is the same as that in Embodiment 1.

FIG. 18 illustrates an example of information regarding eyesight which changes over time. The eyesight information of FIG. 18 indicates that, when the time after the user starts to gaze at a subject at a distance d is indicated by tf [second], a parameter σ of a PSF and a diopter s change over the time tf.

For example, in Embodiment 1, in a case where a distance d=0.5 [m], σ and s are constant as 3.0 and 2.0, respectively. In contrast, in Embodiment 4, in the eyesight information of the user acquired by the eyesight information acquisition unit 103, the time tf [second] after the user starts to gaze at d=0.5 [m] is shorter than 60 seconds, σ and s are respectively 3.0 and 2.0, but if tf is equal to or longer than 60 seconds, σ and s become respectively 2.0 and 1.5 and are thus change over time. In other words, this indicates that the diopter s [D] which is a degree necessary in correction for clear vision is 2.0 immediately after the user sees the object at the distance d=0.5, and the degree s [D] necessary in correction for clear vision changes to 1.5 when 60 seconds have elapsed after gazing at the object. Therefore, the image display device of Embodiment 4 can perform correction in accordance with a change in the eyesight of the user over time by using the eyesight information of the user including the change over time.

The eyesight information acquired by the eyesight information acquisition unit 103 includes information regarding a relationship between an elapsed time after the user starts to gaze at a subject at a predetermined distance and a change in an extent of focus blurring. Thus, the naked-eye image generation unit 104 can generate a naked-eye image on the basis of the eyesight information and a change in a gaze point distance.

There may be the use of eyesight information including information regarding a relationship between an elapsed time after a visual field of the user changes from a bright state to a dark state and a change in brightness of an image visually recognized by the user. In a case of using such eyesight information, the naked-eye image generation unit 104 can generate a naked-eye image on the basis of the eyesight information and the change in brightness in the visual field, and thus the user can clearly see a subject within the visual field even in a case where the brightness changes.

In the image display device of Embodiment 4, there is no lens between the user and the subject, it is possible to achieve an effect equivalent to Embodiments 1 to 3, in which an image of the subject is not spatially distorted or a distortion does not change over time. A far object can be seen clearly without distortion.

In addition, in Embodiment 4, there is a particular effect in which, even in a case where the eyesight of the user changes over time, it is possible to perform correction in accordance with the change in the eyesight of the user over time so as to handle this situation.

In addition, in Embodiments 1 to 4 of the present invention, in the correction image generation step S405, the difference image Id is generated from the visual field image Ie and the naked-eye image In by using (Equation 5), but an equation for generating a difference image is not limited thereto, and any equation may be used as long as the equation is used to calculate an image for correcting a blurring component in a naked-eye image. An example of an equation of calculating a difference image is shown in (Equation 7).

$$i_d(u,v)=ki_e(u,v)-i_n(u,v)+C_{off} \quad \text{(Equation 7)}$$

In (Equation 7), k indicates a gain coefficient of a visual field image, and if k is 1 or more, a component of the visual field image Ie is added to the difference image described in Embodiments 1 to 4.

In this case, in the correction image generation step S405 (refer to FIGS. 4, 14 and 17), an average luminance of luminances of a gaze point and the vicinity thereof on the visual field image Ie is set as a representative value representing a brightness of the gaze point, and if k is increased as the gaze point is darkened, a difference image and a correction image become brighter.

Through the above-described operation in the correction image generation step S405, there is an effect in which, in a case where a subject at which the user gazes is dark, the subject is displayed bright, and thus the user can easily see the subject.

In addition, in Embodiment 1 of the present invention, for simplification of description, the eyesight of the user is assumed to be the same in the left and right eyes, but the eyesight is generally different between the left and right eyes. In this case, eyesight information pieces for the left and right eyes acquired in the eyesight information acquisition step S403 are stored in the HDD 304 (refer to FIG. 3). In addition, in the naked-eye image generation step S404 and the correction image generation step S405, the same processes are repeatedly performed twice for each of the left and right eyes, and thus two correction images can be generated for each of the left and right eyes by using the left and right eyesight information.

Further, in Embodiment 1 of the present invention, a description has been made of a case where the computer 300 executes four steps including the visual field imaging step S400, the distance calculation step S401, the eye position calculation step S402, and the eyesight information acquisition step S403 in this order (refer to FIG. 4), but the four steps have no dependencies on each other, and thus an order of the processes is not limited thereto. For example, the four steps may be executed in any order, and any two, three or four steps may be executed in parallel to each other. This is also the same for the visual field imaging step S400, the distance calculation step S401', the eye position calculation step S402, and the eyesight information acquisition step S403 (refer to FIG. 14) in Embodiment 2, and the visual field imaging step S400, the distance calculation step S401', the eye position calculation step S402', and the eyesight information acquisition step S403 (refer to FIG. 17) in Embodiment 3.

In addition, in Embodiments 1 and 2, as illustrated in FIGS. 2 and 13, the optical systems of the imaging section 110 and the display section 120 have configurations in which light from the display device is guided to the user's visual line through two reflections by using the two half mirrors 123, and, in Embodiment 3, as illustrated in FIG. 15, light from the display device is guided to the user's visual line through one reflection by using the single half mirror 123. However, a configuration of the optical system of the present invention is not limited thereto.

For example, instead of using two half mirrors, a multi-reflection optical system may be used so that light from the display device is guided to the user's visual line through three or more reflections. A configuration of the multi-reflection optical system is disclosed in PTL 6 or the like, and detailed description thereof will be omitted here.
(PTL 6) JP-A-2012-163656

If light from the display device is guided to the user's visual line by using the multi-reflection optical system, it is possible to achieve an effect equivalent to that in Embodiments 1 to 4. In addition, it is possible to reduce a volume of the optical system by using the multi-reflection optical system. For this reason, in a case where the image display device is configured, there is an effect in which the device is miniaturized.

Further, in Embodiments 1 to 4, the description has been made assuming that the user is presbyopic, but the present invention is applicable not only to presbyopia but also to ametropia such as myopia and hyperopia. In a case where the user is myopic, a difference from a case where the user is presbyopic is eyesight information corresponding to the user. FIG. 19 illustrates an example of eyesight information in a case where the user is myopic. In a case where the user is myopic, a near object can be seen clearly but a far object appears blurred in a state of not wearing spectacles. In the example of FIG. 19, in a case where a distance d to a subject is 0.5 m or less, the parameter σ of a point spread function is "0", that is, there is no blurring. This indicates that an extent of blurring increases as the distance d is lengthened. Still further, in a case where a subject at a distance of 0.7 m is seen, a diopter s of a lens for clear vision is −1.0. The projection optical system 122 is configured to include a lens with the focal length 1/s corresponding to the diopter s so that the user can see the image display unit 121 clearly, and this configuration is used in common regardless of presbyopia or myopia. On the other hand, whereas s is a positive value in a case of presbyopia, s is a negative value in a case of myopia. For this reason, there is a difference in that, whereas a convex lens is used for correction of the presbyopia, a concave lens is used for correction of the myopia.

In a case where the user is myopic, images reflected in the eyes of the user become more blurred as a subject becomes more distant. In contrast, as a result of the operations of the imaging section 110, the image generation section 100 realized by the computer 300, and the display section 120 of the image display device of each of Embodiments 1 to 4, the user views a correction image in an overlapping manner in addition to an image which enters to the eyes of the user from a subject, and can thus see the subject clearly. As a result, both a near object and a far object can be seen clearly. In addition, there is no lens between the user and the subject, it is possible to achieve an effect particular to the present invention, in which an image of the subject is not spatially distorted or a distortion does not change over time.

INDUSTRIAL APPLICABILITY

The present invention relates to an image display device which enables a person with ametropia of the eyes to see an object clearly, and is widely used in, for example, a head mounted image display device, night vision goggles, and an augmented reality display device (virtual reality display device) replacing typical spectacles.

REFERENCE SIGNS LIST 1, 2, 3 IMAGE DISPLAY DEVICE
100 IMAGE GENERATION SECTION
101 DISTANCE CALCULATION UNIT
102 EYE POSITION CALCULATION UNIT
103 EYESIGHT INFORMATION ACQUISITION UNIT
104 NAKED-EYE IMAGE GENERATION UNIT
105 CORRECTION IMAGE GENERATION UNIT
110 IMAGING SECTION
111, 111a, 111b VISUAL FIELD IMAGING UNIT (CAMERA)
112, 112a, 112b EYE IMAGING UNIT (CAMERA)
120 DISPLAY SECTION
121, 121a, 121b IMAGE DISPLAY UNIT
122, 122a, 122b PROJECTION OPTICAL SYSTEM
200, 200a, 200b EYE
300 COMPUTER (IMAGE GENERATION SECTION)
301 CENTRAL PROCESSING UNIT (CPU)
302 READ ONLY MEMORY (ROM)
303 RANDOM ACCESS MEMORY (RAM)
304 HARD DISK DRIVE (HDD)
305 VIDEO INPUT INTERFACE (I/F)
306 VIDEO CARD
307 INTERFACE (I/F)

The invention claimed is:
1. A head mounted type or spectacle type image display device which displays images in a visual field of a user in an overlapping manner so that the user can clearly see a subject within the visual field, the image display device comprising:
a visual field imaging unit that captures and outputs a visual field image which is an image of the visual field of the user; and
a processor comprising:
a distance calculation unit that receives the visual field image, and calculates a distance between the subject in the visual field image and the visual field imaging unit so as to output as distance information;
an eyesight information acquisition unit that acquires eyesight information which is information regarding eyesight of the user;
a correction image generation unit that generates and outputs a correction image on the basis of the visual field image, the distance information, and the eyesight information; and
a naked-eye image generation unit that receives the visual field image, the distance information, and the eyesight information, and generates and outputs a naked-eye image, which is a predicted value of an image which is projected on a retina of the user when the user sees the subject without using the image display device, and which is not directly captured from the retina of the user; and
a display unit that receives the correction image, and displays the correction image of the subject within the visual field of the user in the overlapping manner,
wherein the correction image generation unit receives the visual field image and the naked-eye image, and gen- erates and outputs the correction image on the basis of an image obtained by adding a constant value $C_{off}$ to a difference image between the visual field image and the naked-eye image, the $C_{off}$ is a constant which is added so that the difference image does not become a negative value, and wherein the overlapping manner indicates that displaying at the display unit is performed so that the user can visually recognize the subject in a state in which the correction image overlaps an image of the subject which is directly seen by the user.

2. The image display device according to claim 1, the processor further comprising:

an eye position calculation unit that calculates a position and a posture of each eye of the user including a visual line of the user so as to output as eye position information, wherein the naked-eye image generation unit receives the visual field image, the distance information, the eyesight information, and the eye position information, calculates a gaze point distance which is a distance between a gaze point of the subject on the visual line of the user and each eye of the user, and generates and outputs the naked-eye image in a case where the user sees the gaze point.

3. The image display device according to claim 2, wherein the display unit includes a projection optical system that displays an image at the gaze point distance within the visual field of the user in an overlapping manner, wherein the naked-eye image generation unit outputs the gaze point distance, wherein the correction image generation unit generates and outputs the correction image on the basis of the visual field image, the naked-eye image, and the gaze point distance, and wherein the projection optical system controls an optical system so that the correction image is displayed so as to overlap the subject located at the gaze point.

4. The image display device according to claim 2, wherein the visual field imaging unit is a light field camera which captures multi-viewpoint images and can reconfigure an image from any viewpoint, and wherein the visual field imaging unit receives visual line information of the user calculated by the eye position calculation unit so as to reconfigure an image of the visual line of the user and to output as the visual field image.

5. The image display device according to claim 1, wherein the correction image generation unit makes the correction image bright in a case where the visual field of the user is dark.

6. The image display device according to claim 1, wherein the eyesight information includes information regarding a change in the eyesight of the user over time.

7. The image display device according to claim 6, wherein the eyesight information includes information regarding a relationship between an elapsed time after the user starts to gaze at the subject at a predetermined distance and a change in an extent of focus blurring, and wherein the naked-eye image generation unit generates the naked-eye image on the basis of the eyesight information and a change in the gaze point distance.

8. The image display device according to claim 6, wherein the eyesight information includes information regarding a relationship between an elapsed time after the visual field of the user changes from a bright state to a dark state and a change in brightness of an image visually recognized by the user, and wherein the naked-eye image generation unit generates the naked-eye image on the basis of the eyesight information and a change in the brightness of the image within the visual field.

9. An image display method of displaying images in a visual field of a user in an overlapping manner so that the user can clearly see a subject within the visual field, the method comprising:

a visual field imaging step of capturing and outputting a visual field image which is an image of the visual field of the user;

a distance calculation step of receiving the visual field image, and calculating a distance between the subject in the visual field image and a visual field imaging unit so as to output as distance information;

an eyesight information acquisition step of acquiring eyesight information which is information regarding eyesight of the user;

a correction image generation step of generating and outputting a correction image on the basis of the visual field image, the distance information, and the eyesight information; and a naked-eye image generation step of receiving the visual field image, the distance information, and the eyesight information, and generating and outputting a naked-eye image, which is a predicted value of an image which is projected on a retina of the user when the user sees the subject without using an image display device, and which is not directly captured from the retina of the user; and a display step of receiving the correction image, and displaying the correction image of the subject within the visual field of the user in the overlapping manner, wherein the correction image generation step includes a step of receiving the visual field image and the naked-eye image, and generating and outputting the correction image on the basis of an image obtained by adding a constant value $C_{off}$ to a difference image between the visual field image and the naked-eye image, the $C_{off}$ is a constant which is added so that the difference image does not become a negative value, and wherein the overlapping manner indicates that displaying at a display unit is performed so that the user can visually recognize the subject in a state in which the correction image overlaps an image of the subject which is directly seen by the user.

10. A computer program product comprising a non-transitory computer-readable storage media and program instructions stored on the non-transitory computer-readable storage media for causing a computer to execute each of the steps included in the image display method according to claim 9.

* * * * *